US008610958B2

(12) United States Patent
Rossier et al.

(10) Patent No.: US 8,610,958 B2
(45) Date of Patent: Dec. 17, 2013

(54) SYNTHESIS OF AUTHENTICABLE COLOR MULTI-HALFTONE IMAGES

(75) Inventors: Romain Rossier, Oron-la-Ville (CH); Roger D. Hersch, Epalinges (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 164 days.

(21) Appl. No.: 13/385,426

(22) Filed: Feb. 21, 2012

(65) Prior Publication Data

US 2013/0215472 A1 Aug. 22, 2013

(51) Int. Cl.
*H04N 1/405* (2006.01)
*B42D 15/10* (2006.01)

(52) U.S. Cl.
USPC .......... 358/3.06; 358/3.09; 358/3.28; 283/72; 283/91; 283/93; 283/113

(58) Field of Classification Search
USPC ............. 358/3.06, 3.09, 3.28; 283/72, 91, 93, 283/113
See application file for complete search history.

(56) References Cited

U.S. PATENT DOCUMENTS

| 5,374,976 | A | | 12/1994 | Spannenburg | |
|---|---|---|---|---|---|
| 5,788,285 | A | * | 8/1998 | Wicker | 283/93 |
| 5,852,679 | A | * | 12/1998 | Shimizu | 382/180 |
| 6,700,995 | B2 | | 3/2004 | Reed | |
| 7,020,349 | B2 | | 3/2006 | Brunk | |
| 7,307,761 | B2 | * | 12/2007 | Man | 358/3.28 |
| 7,706,025 | B2 | * | 4/2010 | Wang | 358/3.28 |
| 8,355,179 | B2 | * | 1/2013 | Wu | 358/3.28 |

OTHER PUBLICATIONS

C. Hains, S.G. Wang, K. Knox, Digital color halftones, in digitial Color Imaging Handbook, G. Sharma. Ed, CRC Press, 2003, Chapter 6, Sections 6.1 to 6.4.11, pp. 385-430 and Sections 6.8.1 to 6.8.9, pp. 457-470.
R.D Hersch, F.Crété, Improving the Yule-Nielson modified spectral Neugebauer model by dot surface coverages depending on the ink superposition conditions, Color Imaging X: Processing, Hardcopy and Applications, SPIE vol. 5667 (R.Eschbach, G.G. Marcu eds.), 434-445 (2005).
D.R. Wyble and R.S.Berns, A critical Review of Spectral Models Applied to Binary Color Printing, Journal of Color Research and Application 25(1), 4-19, 2000.
R. Balasubramanian,Optimization of the spectral Neugebauer model for printer characterization, J. Electronic Imaging, vol. 8, No. 2, 156-166, 1999.
R. Rossier and R.D.Hersch, Introducing ink spreading within the cellular Yule-Nielsen modified Neugebauer model, Proc. IS&T/SID's 18th Color Imaging Conference, pp. 295-300, 2010.

(Continued)

*Primary Examiner* — Charlotte M Baker

(57) ABSTRACT

The present invention enables creating authenticable continuous tone color multi-ink multi-halftone images offering means of verifying their authenticity. The invention relies on color halftones, color separation into different ink surface coverages for different halftoning methods, mapping of an input gamut into a gamut defined by a set of inks, calculating the optimal boundary between region halftones created with different halftoning methods, and color multi-halftone image generation. The basic authentication is performed by examining the color multi-halftone image under a reference illumination and verifying that the message incorporated within the color multi-halftone is hidden and revealed under a different illumination. Authentication can further be performed by observing the color multi-halftone image both in reflection and transmission modes and verifying that in one of these modes the message is hidden and that in the other mode the message is revealed.

17 Claims, 15 Drawing Sheets

(56) References Cited

OTHER PUBLICATIONS

T. Cholewo, S. Love, Gamut boundary determination using alpha-shapes, Proc. IS&T 7th Imaging Conf., pp. 200-204, 1999.

E.W., Dijkstra, A note on two problems in connexion with graphs, Numerische Mathematik 1, 1959, 269-271.

Rudolf L. Van Renesse, Optical Document Security, Artech House, Third Edition, Chapter 5, Sect. 4, entitled Screen-Decoded images, pp. 146-156, 2004.

* cited by examiner

SYNTHESIS OF AUTHENTICABLE COLOR MULTI-HALFTONE IMAGES

BACKGROUND

Due to the availability of high resolution scanners and low cost desktop printers, counterfeiting of security documents such as bank notes, checks, certification documents, identification cards, passports, travel documents, etc. has become a serious problem. The same is also true for valuable products such as DVDs, CDs, software packages, prescription drugs, cosmetics, fashion articles etc. that are often counterfeited.

The present invention proposes techniques for creating multi-ink color multi-halftone image prints by relying on two or more spatially laid-out halftone screens having different properties, such as different frequencies and different orientations. It includes methods for verifying the authenticity of these color image prints.

In several inventions, hidden watermarks are incorporated into halftones. In U.S. Pat. No. 7,020,349 "Halftone watermarking and related applications", filed Mar. 28, 2006, to inventor Hugh L. Brunk, a watermark is incorporated into an output binary image by a modified halftoning process. The halftone screen is used to determine the geometric distortion of an image in order to facilitate the retrieval of the embedded digital watermark.

In U.S. Pat. No. 6,700,995 "Applying digital watermarks using dot gain correction", filed Mar. 2, 2004, inventor Alastair M. Reed proposes to embed watermarks into a printed image by accounting for the dot gain of the printer. The color values of the watermark region of an image that is to be printed are modified according to the backward dot gain curves of the printer so as to leave the original signal value of the watermark. The teachings of that patent are limited to the modification of the color input image values.

There are prior art methods to create images incorporating security patterns that cannot be scanned without inducing strong artifacts by modulating the carrier screen (dot or line screen) by phase, frequency, angle, size, width or shape.

In Chapter 5, Sect. 4 of the book by Rudolf L. Van Renesse, Optical Document Security, Artech House, Third Edition, entitled Screen-Decoded images, pp. 146-169, methods are taught for incorporating a security message into a printed image, for example by dot phase modulation pp. 155-156. Locally shifted ink dots form a recognizable message. When a decoding dot screen overlay is placed on the printed ink dots, the hidden message is revealed. The presented method applies only to single ink pictures.

In U.S. Pat. No. 5,374,976, "Support provided with a machine detectable copying security element", filed Dec. 20, 1994, inventors Sijbrand Spannenburg and Nt Petten teach a method for producing screen angle modulated single ink images (SAM). The SAM elements are composed of single ink fine line segments whose angular orientation is different on the inner and outer region of the encoded hidden message. In a scanned copy, due to the dot gain that depends on line segment orientation, the message hidden within the single ink printed image becomes visible. The presented method applies only to single ink pictures.

In contrast to the above mentioned disclosures, the present invention aims at creating multi-ink full color halftone images embedding a hidden message made of at least two spatially laid-out halftone screens whose frequencies, orientations or shapes differ one from another. When generating the parts of the image incorporating the hidden message, the effective ink surface coverages depend on the selected halftoning method. Halftoning methods of different frequencies, orientations or shapes exhibit different dot gain behaviors and therefore reveal the hidden message when reproduced by a potential counterfeiter. In order to hide the boundaries between different spatially laid-out halftones we present a method enabling finding the optimal boundary region connecting the differently halftoned parts. Thanks to the color prediction model based calculation of halftone dependent ink surface coverages and to the optimal boundaries connecting differently halftoned parts, the naked human eye is not able to distinguish between them. The message whose foreground and background are differently halftoned remains therefore hidden. The synthesized multi-ink multi-halftone images may represent continuous tone pictures of different origins such as photographs, graphic designs, paintings or synthetic images.

SUMMARY

The present invention proposes techniques for creating multi-ink color multi-halftone image prints by relying on two or more spatially laid-out halftone screens having different properties, such as different frequencies and different orientations. Hidden messages are incorporated within the color multi-halftone image by halftoning the message background with a halftoning method different from the one that is used to produce the message foreground. The dot gain within the differently halftoned ink separation layers is different. By relying on an accurate color or spectral prediction model enhanced to account for the dot gain of the ink halftone dots, we accurately compute the ink surface coverages of the ink separation layers so that the halftones produced with the different halftoning methods produce substantially identical colors. The colors are also preserved at the boundary between the message foreground and background regions by computing an optimal boundary between these regions. When viewed under a specific illumination, the naked human eye is not able to see the difference between the message foreground and background regions of the color multi-halftone image. When printed on valuable items or on their packages, the authenticable color multi-halftone images provide strong means of verifying their authenticity. Counterfeiters do not have access to systems allowing computing halftoned ink separation layers comprising different halftone shapes produced with different halftoning methods producing substantially identical colors and preserving the colors at the boundary between the differently halftoned regions. Considered valuable items are banknotes, checks, trust papers, identification cards, passports, travel documents, tickets, diploma, business documents, bank documents, tracing documents, medical drug packages, commercial art, fashion articles, watches, clocks, bottles of perfumes, body care liquids, alcoholic drinks, clothes, as well as attached labels.

The present invention also proposes a computing system for producing authenticable printed multi-ink color multi-halftone images. First, a set of inks is selected and by relying on a spectral prediction model its gamut is computed. Then, two different halftoning methods are selected as well as an input color image and an input color gamut. A message is positioned and its foreground and background regions are determined within the input image. The gamut of the input image is mapped onto the gamut of the set of inks. With an ink spreading enhanced color prediction model, under a specific illumination, ink surface coverage mappings between desired gamut mapped input colorimetric values and ink surface coverages for the two halftoning methods are established. Thanks to calibration with the two different halftoning methods, this model ensures that the gamut mapped input colors yield substantially similar colorimetric values when halftoned with the two different halftoning methods. The gamut mapped input color image is separated into multi-valued ink separations for the two considered halftoning methods. These multi-valued ink separations are halftoned with the two different halftoning methods and the resulting halftoned ink separation layers are merged by finding an optimal boundary between the message foreground and background regions. These halftoning and merging operations can be carried out either in reflection mode, when the ink spreading enhanced color prediction model is calibrated with reflection measurements such as reflectance spectra or in transmission mode, when the color prediction model is calibrated with transmission measurements such as transmittance spectra. When the calibration of the model, the halftoning and the merging is performed in reflection mode, the message is hidden when viewed in reflection mode and revealed when viewed in transmission mode. When the calibration of the model, the halftoning and the merging is performed in transmission mode, the message is hidden when viewed in transmission mode and revealed when viewed in reflection mode. The absence of the message in one of the two modes and its presence in the other mode enables authenticating the valid item incorporating the color multi-halftone image.

For further authentication purposes, under the chosen reference illuminant, e.g. normal daylight, a human observer verifies that the message is hidden within the color multi-halftone image. The human observer also verifies that the message is revealed under a different illumination, e.g. an A illuminant obtained with a tungsten lamp.

A further authentication variant consists in superposing a revealing layer on the top of the color multi-halftone image and verifying that the hidden message is revealed. The revealing layer can be embodied by a revealing monochrome or multi-chromatic halftone printed on a transparency sheet. This halftone comprises a dot screen or line screen at an angle and a frequency equal to one of the ink angles and screen frequencies used to halftone the message foreground or background regions. The revealing layer can also be composed of a one-dimensional array of lenticular lenses whose angle and frequency is equal to one of the angles and frequencies used to halftone the message foreground or background regions.

A further protection consists in incorporating into the color multi-halftone a second hidden message whose foreground region is produced with a halftoning method different from the halftoning method used to render the background region and different from the method used to render the first message foreground region.

For automatic or semi-automatic authentication, a computer based authentication apparatus comprising a reference illuminant, a multi-channel sensor array and a computing system can be used. The reference illuminant illuminates the color multi-halftone image, the multi-channel sensor array acquires a sampled image of the color multi-halftone image, and the computing system verifies that the colors of the sampled image are substantially similar to the colors of a previously stored original color multi-halftone image. It further extracts the differently halftoned regions of the acquired sampled image and compares the extracted message with a previously registered reference message.

DESCRIPTION OF THE INVENTION

Figure 1A:
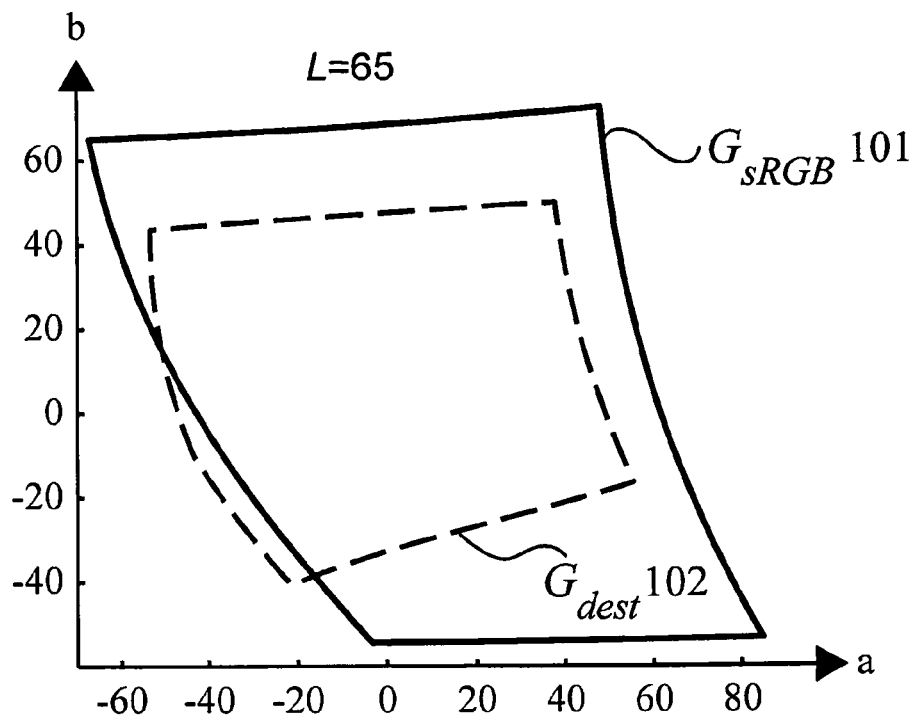
FIGS. 1A and 1B show at different lightness levels a display gamut $G_{sRGB}$ and a destination gamut $G_{dest}$ of cyan, magenta and yellow inks for the halftoning method $h_1$.

The present invention aims at producing variable intensity color multi-ink multi-halftone images comprising parts which are reproduced with different halftoning methods. Each of these halftoning methods has its own specific parameters such as a given screen frequency, a set of screen orientations and a screen shape. Considered halftoning methods are clustered-dot dithering, dispersed dithering such as blue noise dithering, error diffusion halftoning and table-based halftoning methods, see C. Hains, S. G. Wang, K. Knox, Digital color halftones, in digital Color Imaging Handbook, G. Sharma Ed, CRC Press, 2003, Chapter 6, Sections 6.1 to 6.4.11, pp. 385-430 and Sections 6.8.1 to 6.8.9, pp. 457-470, herein incorporated by reference and denoted [Haim 2003]. The color reproduction process of the original document accounts for different dot gains of the differently halftoned regions of the image. By using a color prediction model and a reference illuminant, the colors are correctly reproduced by computing for each halftoning method separately its corresponding effective ink surface coverages. In order to avoid visible tone variations at the boundaries between differently halftoned background and foreground message regions, optimal boundaries between them are created. A document or a valuable article incorporating color multi-halftone images with different regions rendered with different halftoning methods can be authenticated (a) by verifying that despite having regions being rendered with different halftoning methods, the resulting color image looks seamless when seen with the naked eye, (b) by superposing a revealing layer and verifying the presence of the differently halftoned regions, (c) by photocopying the color multi-halftone image and verifying the appearance of the differently halftoned regions, (d) by observing the color multi-halftone image with a magnifier and verifying the presence of the differently halftoned regions, (e) by scanning the color multi-halftone image and verifying either visually on a display or by a computer program module the presence of the differently halftoned regions, (f) by verifying the presence of the differently halftoned regions under an illuminant that differs from the reference illuminant or (g) by verifying that in one of the reflection and transmission modes the differently halftoned regions are hidden and that they are visible in the other mode. The halftones can be printed on various substrates, such as paper, plastic, glass, plexiglass, metal. The halftones can be conceived to hide the message either in reflection mode or in transmission mode.

Regarding the vocabulary, the terms CIE-XYZ and CIELAB refer to standard colorimetric systems, see Digital Color Imaging Handbook, Sharma G. Ed., Chap. 1, Sections 1.5 to 1.7, pp. 15-40, CRC Press, 2003, herein incorporated by reference and denoted [Sharma 2003]). In the present disclosure, the L*, a*, b* coordinates, as well as the chroma C* and the hue h* of the CIELAB colorimetric system are written without the star, i.e. respectively L, a, b, C, h. The term dot gain refers to both the optical and the physical dot gain of halftone dots. The optical dot gain known as the Yule-Nielsen effect is mainly due to the lateral propagation of light within the substrate (e.g. paper) and to the multiple reflections between the substrate and the print-air interface. The physical dot gain is due to the ink spreading phenomenon, when inks are printed on the substrate (e.g. paper) only, or in superposition with one or several other inks. The superposition-dependent ink spreading phenomenon is described by R. D Hersch and F. Crété in the paper "Improving the Yule-Nielsen modified spectral Neugebauer model by dot surface coverages depending on the ink superposition conditions", Color Imaging X: Processing, Hardcopy and Applications, SPIE Vol. 5667 (R. Eschbach, G. G. Marcu eds.), 434-445 (2005), herein incorporated by reference and denoted [Hersch and Crété 2005]. The dot gain yields generally effective ink halftone surface coverages larger than nominal surface coverages. Nominal surface coverages are the coverages that are asked for, e.g. by the printing software. The term "light source" or "illuminant" refers to a light source having a specific spectral power distribution. Symbol $h_i$ indicates a halftoning method and its index i expresses the selected halftoning method. A halftoning method is fully specified by a halftoning algorithm (e.g. clustered dot dithering) and by its halftoning parameters, e.g. screen dot of given surface coverage, given period, given screen angles, given screen shape. As examples, we define as $h_1$ halftones mutually rotated layers of clustered ink dots of the cyan, magenta, yellow inks having an angle of respectively 75°, 45° and 15° and having a screen frequency of 130 lines per inch. We define as $h_2$ the same halftoning method as $h_1$ with the same halftoning parameters except that the screen frequency is 100 lines per inch. The term "input gamut" refers to the color volume in a colorimetric space (e.g. CIELAB) formed by the colors present within an input image, present within several input images or formed by the colors that are displayable on a given display, e.g. an sRGB display. The term "destination gamut" refers to the color volume formed by all printable colors of the destination image, with a given set of inks, with a specific halftoning method and with specific halftoning parameters (screen frequency, screen orientations, screen shape under a given reference illuminant). Symbol G indicates a gamut and its index expresses the considered gamut. For example $G_{sRGB}$ is the gamut of a sRGB display and $G_{dest}$ is the destination gamut of images printed with cyan, magenta, yellow and black ink halftones generated according to one of the halftoning methods. A "message" is a piece of information such as few typographic characters, a word, a sentence, a symbol, a graphic design or a logo. A message can be hidden within a color image. A message is defined by regions with well delimited contours, e.g. the contours of typographic characters or of symbols. In most examples, we consider the destination gamut given by mutually rotated layers of clustered ink dots of the cyan, magenta, yellow and possibly black inks at the classical screen angles and at the specified frequency. However, other inks can also be used, e.g. red, orange, green, blue, daylight fluorescent magenta, daylight fluorescent yellow. Other halftoning methods can be used, e.g. blue noise dithering or error diffusion. Within the present disclosure, input and destination images are assumed to be color images. Nevertheless, gray intensities are also part of the color space and as is well known in the art, can be rendered with a black ink and/or with several colored inks. Therefore, the present invention is also applicable to grayscale images.

The invention relies on (a) color halftones, (b) spectral and/or color prediction models for color halftones, (c) the color gamut produced with halftones generated according to different halftoning methods, including different halftoning parameters such as screen frequencies, screen orientations and screen shapes, (d) color separation into different ink surface coverages thanks to a model specially calibrated on the selected halftoning method, (e) mapping of an input gamut into a destination gamut, (f) calculation of the optimal boundary between halftoned image regions created with different halftoning methods, (g) color multi-halftone images generation and printing. These elements are detailed in the text that follows.

(a) Color Halftones

As is known in the art, color halftones may be formed by mutually rotated layers of clustered ink dots or may also be generated with a blue noise dither matrix, or by error-diffusion [Hains 2003]. In these well-known halftoning methods, halftone ink dots do partially overlap. Therefore several inks may be partially superposed and printed at the same pixel locations.

In the case of three inks, such as cyan (c), magenta (m) and yellow (y), the superposition of the 3 ink halftone layers yields halftones with colorants comprising the substrate (e.g. paper) white (w), each ink color and each ink superposition color, in the present case: white (w), cyan (c), magenta (m), yellow (y), red (r=m & y), green (g=c & y), blue (b=m & c), and chromatic black (k=c & m & y), where the "&" sign indicates the superposition of the inks. All superposition variants of 3 inks yield 8 colorants and of 4 inks yield 16 colorants, see D. R. Wyble and R. S. Berns, "A critical Review of Spectral Models Applied to Binary Color Printing", Journal of Color Research and Application 25(1), 4-19, 2000, herein incorporated by reference and denoted [Wyble and Berns 2000].

When printing the ink layers independently of one another, for example with mutually rotated layers, with blue noise dithering, or with error diffusion, the surface coverages of the colorants $a_1$ to $a_8$ representing the substrate (e.g. paper), the single inks and the superpositions of two or three inks can be expressed as functions of the surface coverages of the inks $u_1$, $u_2$, $u_3$, as follows:

$$a_1=(1-u_1)(1-u_2)(1-u_3); a_2=u_1(1-u_2)(1-u_3); a_3=(1-u_1)u_2(1-u_3);$$

$$a_4=(1-u_1)(1-u_2)u_3; a_5=u_1u_2(1-u_3); a_6=u_1(1-u_2)u_3;$$

$$a_7=(1-u_1)u_2u_3; a_8=u_1u_2u_3; \quad (1)$$

Equations (1) are known as the Demichel equations. They can be extended to 4 or more inks, see [Wyble and Berns 2000].

(b) Spectral and Color Prediction Models for Color Halftones

The goal of a color prediction model is to establish a mapping between the ink surface coverages of a selected set of inks and the resulting printed colors. When such a mapping is known, one finds the inverse mapping, i.e. the mapping between the desired color and ink surface coverages of the considered set of inks by applying an optimization procedure known in the art (e.g. fminsearch or fmincon Matlab operator). Under a given illuminant, the light reflected by a known reflectance spectrum, respectively transmitted by a known transmittance spectrum, can always be converted to a color (see Eqs. (2a) and (2b) in the next section). Therefore, a spectral prediction model predicting the spectra in the visible wavelength range is also a color prediction model.

As alternative to a color prediction model, one may directly establish a mapping between desired color and surface coverages of the inks by printing samples with combinations of all selected inks at variations of surface coverages e.g. surface coverages of [0, 0.05, 0.10, . . . 0.95, 1]. This yields 21 samples per ink, i.e. for a set of 3 inks, 9261 samples. Each sample is measured by a spectrophotometer under the reference illumination and converted to a color value. One may then interpolate between these color values to create the mapping between desired color and surface coverages of the inks, see R. Bala, Chapter 5, Device Characterization, Section 5.4.5. Lattice-based interpolation, in Digital Color Imaging Handbook, (Ed. G. Sharma), pp. 301-304.

The Yule-Nielsen modified Spectral Neugebauer prediction model (hereinafter: YNSN) specifies the non-linear relationship between the reflectance $R(\lambda)$ of a color halftone, the reflectances of the halftones individual solid colorants $R_i(\lambda)$ and their surface coverages $a_i$ by a power function whose exponent n can be optimized according to the reflectance of a limited set of color halftone patches, see [Wyble and Berns 2000].

$$R(\lambda) = \left(\sum_i a_i * R_i(\lambda)^{\frac{1}{n}}\right)^n \quad (2a)$$

In case that the color halftones are generated in transmission mode, we obtain for the transmittance $$T(\lambda) = \left(\sum_i a_i * T_i(\lambda)^{\frac{1}{n}}\right)^n \quad (2b)$$

where $T_i(\lambda)$ expresses the measured transmittance of the individual solid colorants.

In order to make accurate spectral or color predictions, the YNSN model needs to be extended, for example by combining it with an ink spreading model, see [Hersch and Crété 2005].

Another possibility of extending the YNSN model in order to provide higher prediction accuracy is to consider not only reflectances $R_i$ of printed patches at all combination of surface coverages 0 (no ink) and 1 (selected ink), i.e. 8 combinations for 3 inks, but reflectances of printed patches $R_i$ (called cellular Neugebauer primaries) at all combinations of 0, 0.5 and 1 surface coverages (27 combinations for 3 inks). According to this extension, known as the cellular Yule-Nielsen modified Neugebauer model (see R. Balasubramanian, Optimization of the spectral Neugebauer model for printer characterization, J. Electronic Imaging, Vol. 8, No. 2, 156-166, 1999, incorporated by reference), reflectance predictions are carried out within the sub-domains formed by ink surface coverages either between 0 and 0.5 or between 0.5 and 1. Ink spreading is accounted for within each sub-domain. The details are given in the article by R. Rossier and R. D. Hersch, "Introducing ink spreading within the cellular Yule-Nielsen modified Neugebauer model", Proc. IS&T/SID's 18th Color Imaging Conference, pp. 295-300, 2010, herein incorporated by reference, referred to as [Rossier and Hersch 2010]. Note that the same principles apply in transmission mode, simply by replacing reflectance measurements $R_i$ by transmittance measurements $T_i$ and by making transmittance predictions within sub-domains.

(c) Color Gamuts Produced with Halftones Generated According to Different Halftoning Methods, Each Method Having its Specific Halftoning Parameters Such as a Screen Frequency, a Set of Screen Orientations and a Screen Shape In order to map the input image into a printable destination image, we need to establish the printable destination gamut (volume in 3D colorimetric space such as CIELAB). Since for a given set of inks and printer, the gamuts obtained by different halftoning methods are substantially similar, we define the destination gamut as the gamut produced by the colors of the $h_1$ halftoning method. By considering suitable combinations of the ink surface coverages, for example by varying the cyan, magenta and yellow ink surface coverages in steps of 0.02, we obtain according to the ink spreading YNSN model described by Eqs. (1) and (2) or for more accurate spectral predictions with the ink spreading enhanced cellular Yule-Nielsen model the corresponding set of spectral reflectances $\vec{R}_1, \vec{R}_2, \ldots$. For the selected reference illuminant, this set of spectral reflectances can be converted to tri-chromatic CIE-XYZ values and then to CIELAB values [Sharma 2003]. The conversion of a reflectance spectrum $\vec{R}_i$ to tri-stimulus CIE-XYZ is carried out with the selected reference illuminant $\vec{I}_{ref}$ according to the well-known formula $$\begin{bmatrix} X \\ Y \\ Z \end{bmatrix} = K \cdot \begin{bmatrix} \vec{x} \\ \vec{y} \\ \vec{y} \end{bmatrix} \cdot \text{diag}(\vec{R}_i) \cdot \vec{I}_{ref} \quad (3)$$

where the "diag" operator creates a matrix whose diagonal elements comprise the spectral reflectance components of $\vec{R}_i$ and whose other elements are zero and where the vectors $\vec{x}$, $\vec{y}$ and $\vec{z}$ contain the color matching coefficients of the color matching functions known as $\bar{x}(\lambda)$, $\bar{y}(\lambda)$, and $\bar{z}(\lambda)$. Vectors $\vec{I}_{ref}$ and $\vec{R}_i$ have one sample per wavelength, for example 36 samples at wavelengths [380 nm, 390 nm, . . . 730 nm]. CIE-XYZ colors can also be computed in transmission mode by replacing reflectances $\vec{R}_i$ by transmittances $\vec{T}_i$. As known in the art, K is a normalization scalar calculated to yield a Y value of 100 for the perfect white reflectance $[1\ 1\ \ldots\ 1]^T$, respectively the perfectly transmitting transmittance $[1\ 1\ \ldots\ 1]^T$.

Figure 1B:
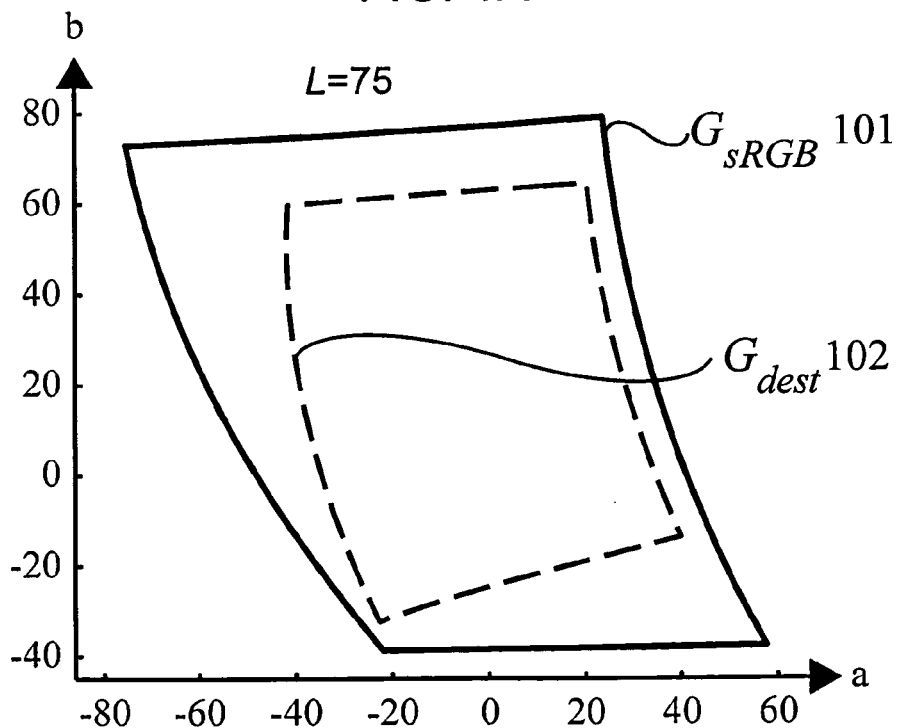

These CIELAB values span the destination gamut $G_{dest}$. As illustration, FIGS. 1A and 1B show schematically a typical input gamut $G_{sRGB}$ (sRGB display gamut 101) as well as the $G_{dest}$ gamut, displayed at two CIELAB L lightness values of L=65 and L=75.

(d) Color Separation into Different Ink Surface Coverages Thanks to a Color Prediction Model Specially Calibrated for the Selected Halftoning Method For the color separation of digital color images according to different halftoning methods, we create an ink separation table incorporating the correspondence between colorimetric values (e.g. CIELAB) and surface coverages of the inks for the considered halftoning methods. Since in the present example, we consider two different halftoning methods $h_1$ and $h_2$, for each CIELAB entry in the 3D color separation table, we enter in the table the corresponding nominal surface coverages that correspond to the $h_1$ and $h_2$ halftonirig methods. The nominal surface coverages are fitted by minimizing the sum of square differences between desired CIELAB color components and predicted CIELAB color components under a reference illuminant, typically the D65 illuminant, according to a selected prediction model, e.g. the ink spreading enhanced cellular Yule-Nielsen model [Rossier and Hersch 2010].

(e) Mapping of an Input Gamut into Destination Gamut The goal is to map an input gamut given for example as sRGB values or as input cyan $c_{in}$, magenta $m_{in}$ and yellow $y_{in}$ values into a destination gamut printable with a set of inks. There are several ways of mapping the input color gamut onto the destination gamut $G_{dest}$.

Figure 2:
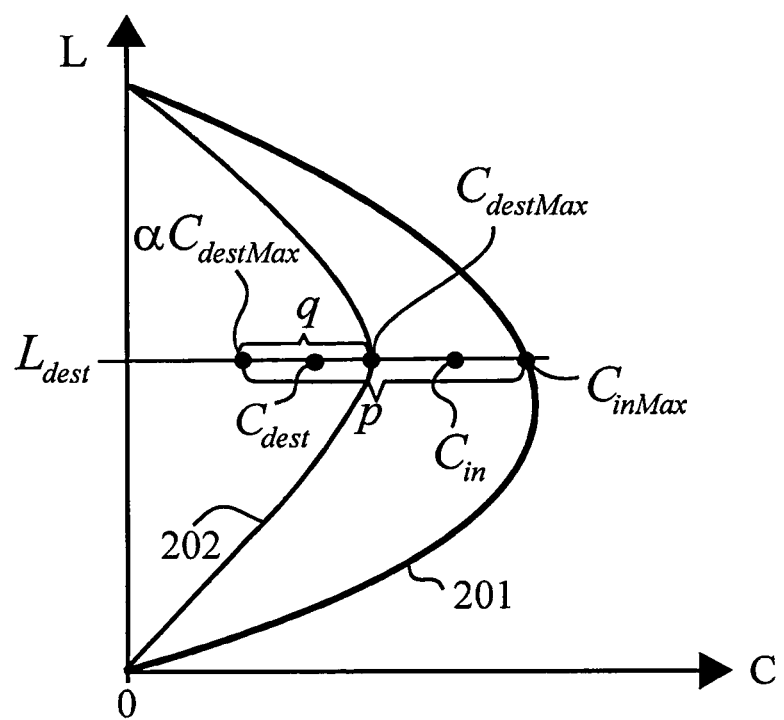
FIG. 2 shows an input gamut 201 and a destination gamut 202, as well as a corresponding gamut mapping scheme.

FIG. 2 shows a typical example where the input gamut 201 is outside the destination gamut 202. Therefore, in order to have a mapping between the input gamut and the $G_{dest}$ destination gamut which preserves the hues as much as possible, there is a need to perform gamut reduction. The gamut reduction can be performed with standard gamut mapping algorithms (GMAs) as described by J. Morovic and M. R. Luo in the paper "The fundamentals of gamut mapping: A survey", J. Imag. Sci. Technol., vol. 45, no. 3, pp. 283-290, 2001. The hue preserving gamut reduction method proposed in the present disclosure relies on the mapping A of the input lightness range into the destination lightness range, e.g. a linear mapping, on the preservation of the hue and on the mapping of the input chroma range into the destination gamut (FIG. 2).

Before performing the mapping of an input gamut into a destination gamut, one must be able to compute the external hulls of both the input and destination gamuts with a method known in the art, for example by computing in 3D a mesh of the gamut's hull, see T. Cholewo, S. Love, Gamut boundary determination using alpha-shapes, Proc. IS&T $7^{th}$ Imaging Conf., pp. 200-204, 1999, herein incorporated by reference, and denoted [Cholewo and Love 1999] or by computing in 2D, separately for each hue or for each lightness slice the boundaries of the input and destination gamuts (note that a hue slice may correspond to a hue angle interval $\Delta h$ of 15 degrees and a lightness slice to a lightness interval $\Delta L$ of 5).

Gamut reduction is performed as follows. First, a given input CIELAB lightness $L_{in}$ is mapped into the corresponding destination lightness $L_{dest}$ by the lightness mapping operation $\Lambda$. Then, for the current hue angle $h_{in}=\arctan(b_{in}/a_{in})$, the input chroma $C_{in}$ is mapped into the destination chroma $C_{dest}$. Mapping the input CIELAB chroma $C_{in}=((a_{in})^2+(b_{in})^2)^{1/2}$ to the output chroma $C_{dest}$ requires intersecting the constant $L_{dest}$ chroma line passing through $C_{in}$ with the input and destination gamut boundaries and obtaining the respective intersection points $C_{inMax}$ and $C_{destMax}$. The chroma remains constant ($C_{dest}=C_{in}$) in the C interval between 0 and $\alpha C_{destMax}$ (FIG. 2). The factor $\alpha$, between 0 and 1, for example ½, defines the internal part of the gamut where the chroma does not change, i.e. input chroma and destination chroma values remain identical. In case that the input chroma $C_{in}$ fulfills the condition to $\alpha C_{destMax} < C_{in} < C_{inMax}$ the input chroma is mapped onto the destination chroma according to the following formula $$C_{dest} = \alpha \cdot C_{destMax} + \left(\frac{C_{in} - \alpha \cdot C_{destMax}}{C_{inMax} - \alpha \cdot C_{destMax}}\right)^\gamma (C_{destMax} - \alpha \cdot C_{destMax}) \quad (5)$$

where the γ exponent expresses a possible non-linearity of the chroma mapping. With γ=1, the mapping is linear.

The mapping of an input gamut $G_{sRGB}$ into the destination gamut $G_{dest}$ can be embodied by a gamut mapping table in the selected colorimetric space, e.g. CIELAB. In such an embodiment, each CIELAB entry representing an input color such as a display color incorporates a mapped destination CIELAB value. In another embodiment, gamut mapping can be incorporated into a ink color separation table by having directly for each CIELAB entry (input color) the surface coverages corresponding to the given halftoning method and halftoning parameters.

Figure 3A:
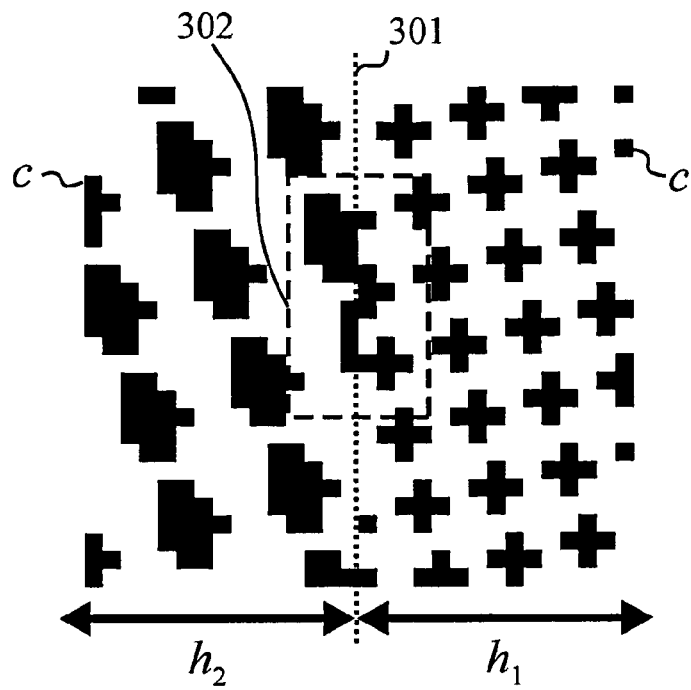
FIGS. 3A and 3B show an image rendered with the halftoning methods $h_1$ and $h_2$ for the cyan ink, together with an arbitrary border 301 and an optimal border 303 between the two halftones.

(f) Calculation of the Optimal Boundary Between Region Halftones Created with Different Halftoning Method and/or Parameters In applications, where messages are hidden into a color image by applying two halftoning methods and/or parameters defining the message foreground and background regions, one needs to calculate the optimal boundary between the differently halftoned parts of the image. For example, FIG. 3A shows a uniform color image where the left part of the image is rendered with halftoning method $h_2$ by taking 35% nominal surface coverage of cyan and where the right part of the image is rendered with halftoning method $h_1$ by taking 30% nominal surface coverage of cyan so as to have a perfect color match between the two differently halftoned parts of the image. Since the $h_i$ halftoning method has a higher screen frequency (1301*pi*) than the $h_2$ halftoning method (1001*pi*), the increased dot gain of $h_1$ is compensated by using less surface coverage of the cyan ink for $h_1$. The computation of the ink surface coverages for a given halftoning method is performed with a color or spectral prediction model, e.g. the ink spreading enhanced cellular Yule-Nielsen model (see Section b), and by minimizing the sum of square differences between predicted CIELAB and desired CIELAB color components. At the boundary 301 between the two halftones, we observe that some pixels of the halftone produced with $h_1$ are placed adjacently to pixels produced with $h_2$. This is visible in the dashed region rectangle 302. This yields in this region more printed cyan pixels c than are needed to render the desired uniform color. Therefore, without boundary optimization, this dashed region stands out within the final printed color halftone image. This can be avoided by calculating an optimal boundary with the following method.

In order to find an optimal boundary separating the two halftones, where e.g. the border pixels at the left of the boundary are produced by halftoning method $h_2$ and at the right part of the boundary are produced by halftoning method $h_1$, we divide the possible boundary paths into sub-paths to which we associate a cost. The optimal boundary is then calculated by finding the set of sub-paths with the minimal sum of costs, when progressing from one boundary extremity to the second boundary extremity, e.g. from the upper part to the bottom part of the vertical boundary between message foreground and message background.

Figure 4A:
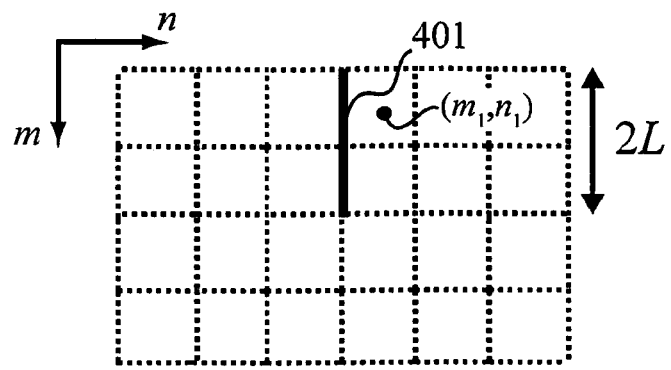
FIGS. 4A, 4B, 4C and 4D show the initial sub-path 401 as well as three possible sub-paths 402, 404 and 406 for creating a boundary deliminating two different halftones.
Figure 4B:
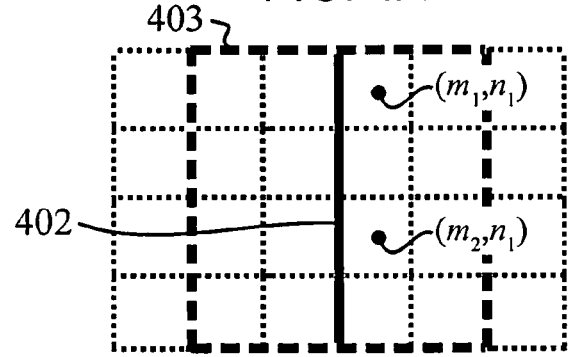
Figure 4C:
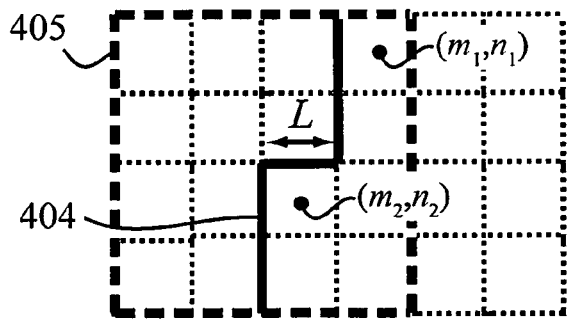
Figure 4D:
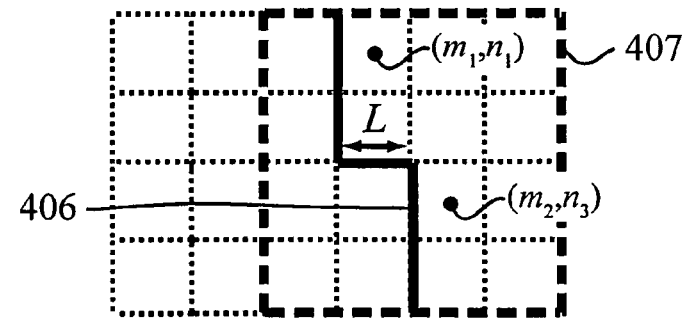

In the following example, where we calculate an optimal boundary from a top location to a bottom location, we assume that boundary sub-path extremities are located at the top-left corner of individual pixels. A sub-path is a link between the top left corner of one pixel and the top left corner of another pixel. We start from a given initial pixel location $(m_1,n_1)$ (FIG. 4A) at the top location and draw the initial path 401 as a straight line of length 2L from pixel $(m_1,n_1)$ to pixel $(m_1+2L,n_1)$. The factor L is a constant integer that is a fraction of the size of the considered screen elements. In the considered example, we set L to 1. Then, we draw three possible sub-paths by considering three possible path directions and we associate a cost to these sub-paths. The first possible sub-path 402 (FIG. 4B) consists in connecting the initial path with a second straight line of length 2L from pixel $(m_2,n_1)$ to pixel located at $(m_2+2L,n_1)$ where $m_2=m_1+2L$. The associated cost is given by considering a square region 403 of edge size 4L centered on the top-left corner of pixel $(m_2,n_1)$ and by computing the square difference between the number of pixels present within the square region 403 when delimitating the two halftones with the boundary 402 and the number of pixels present within the square region 403 when having only pixels halftoned by method $h_1$. The second possible sub-path (FIG. 4C) is given by connecting the initial path with a straight line of length 2L from pixel $(m_2,n_2)$ to pixel located at $(m_2+2L,n_2)$ where $n_2=n_1-L$ (404). In this situation, we are moving the boundary 404 to the left by L pixels. In a similar way as before, the associated cost is calculated within the region 405 centered on the top-left corner of pixel $(m_2,n_2)$. The third path is given by moving with the boundary 406 to the right to $(m_2,n_3)$ and then to $(m_2+2L,n_3)$ where $n_3=n_1+L$ and by associating a third cost to the region 407 centered on the top-left corner of pixel $(m_2,n_3)$. This operation is repeated by replacing the initial pixel location $(m_1,n_1)$ with the three pixel locations $(m_2,n_1)$, $(m_2,n_2)$, $(m_2,n_3)$, recomputing for all considered sub-paths their costs, until the bottom location of the considered region is reached. One can constrain the width expansion of the sub-paths by avoiding moving the boundary outside a certain distance right or left from the considered non-optimized halftone region boundary.

Figure 5A:
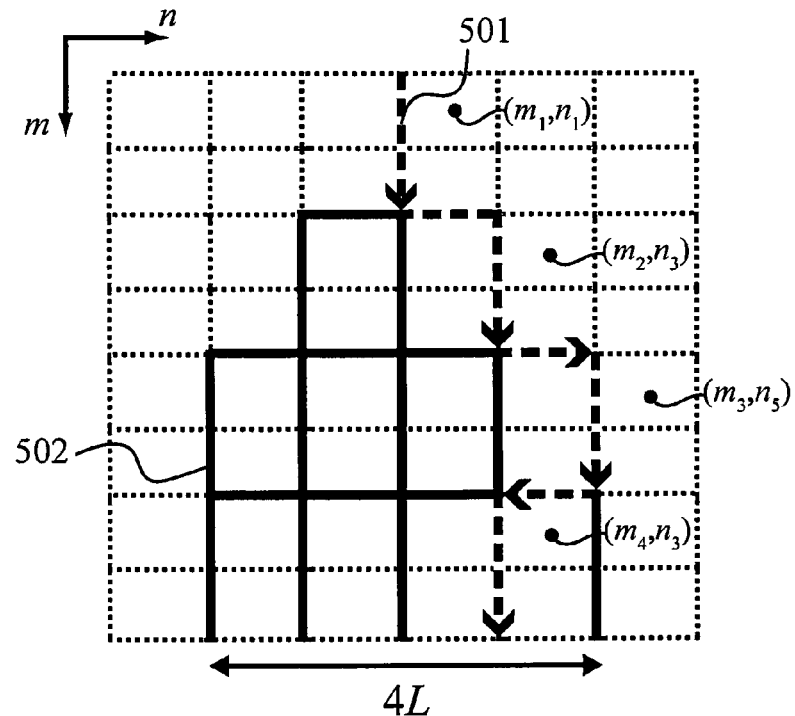
FIG. 5A shows from an initial pixel location all possible boundaries 502 composed of sub-paths as well as one specific boundary 501 (dashed)

FIG. 5A shows all possible paths 502 starting from the top-left corner of the initial pixel $(m_1,n_1)$, where the width expansion of the sub-paths from the non-optimized vertical boundary is constrained to a size of 4L. The dashed line 501 represents one possible boundary made of sub-paths that connect the left boundaries of pixel locations $(m_1,n_1)$, $(m_2,n_3)$, $(m_3,n_5)$ and $(m_4,n_3)$.

Figure 3B:
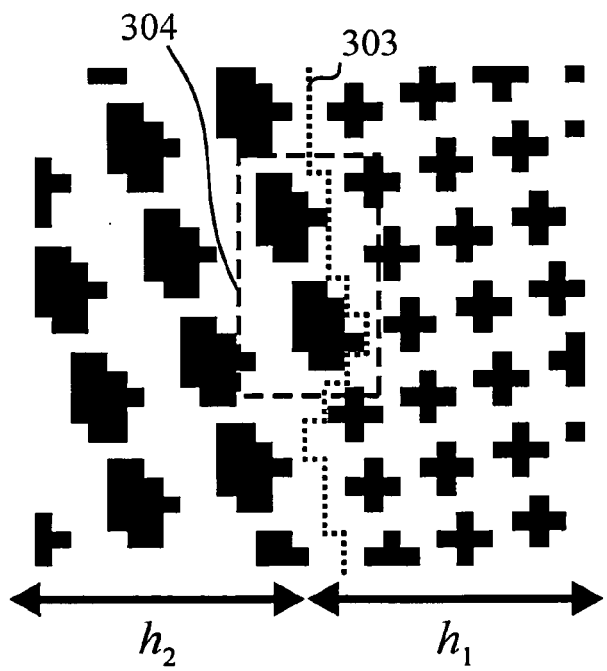
Figure 5B:
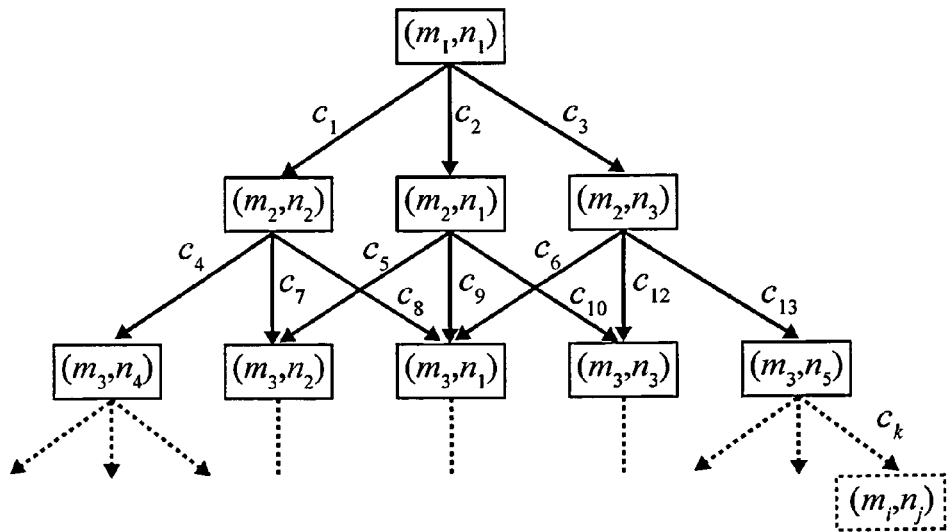
FIG. 5B shows the directed graph used to find the optimal boundary between two halftones.

In order to choose the sub-paths defining the optimal boundary, we generate a directed graph G(V,E), see FIG. 5B, where the set of nodes V is the set of pixel locations $(m_i,n_j)$ and the set of edges E is the set of connections from the nodes $(m_i,n_j)$ to the nodes $(m_{i+1},n_{j+1})$. In addition, we define the weight $c_k$ of the edges from $(m_i,n_j)$ to $(m_{i+1},n_{j+1})$ as the computed cost with the square region centered at the top left corner of pixel $(m_{i+1},n_{j+1})$. The minimal path length is then calculated from the first node $(m_1,n_1)$ to the last node with Djikstra's Algorithm (See E. W., Dijkstra, A note on two problems in connexion with graphs, Numer. Math. 1, 1959, 269-271, herein incorporated by reference). The optimal boundary is drawn by connecting the boundaries between the pixel locations $(m_i,n_j)$ defining the minimal path length. FIG. 3B shows the optimal boundary 303 computed with the described method that separates the two halftones produced with the $h_1$ and $h_2$ halftoning methods. We observe that at within the region 304 in FIG. 3B, there is no pixel of $h_1$ placed adjacently to pixels of $h_2$. In addition, the relative amount of pixels in region 302, i.e. the nominal surface coverage, corresponds to the desired amount of pixels within regions of halftone generated by halftoning method $h_1$.

The proposed algorithm is extended to color halftones by changing the calculation of the weight $c_k$ when progressing from a node $(m_i,n_j)$ to a node $(m_{i+1},n_{j+1})$. Instead of calculating this weight for a single layer, e.g. the cyan layer, one may calculate the weight of each color layer separately and then use as the weight $c_k$ the sum of the weights of all color layers.

Figure 6:
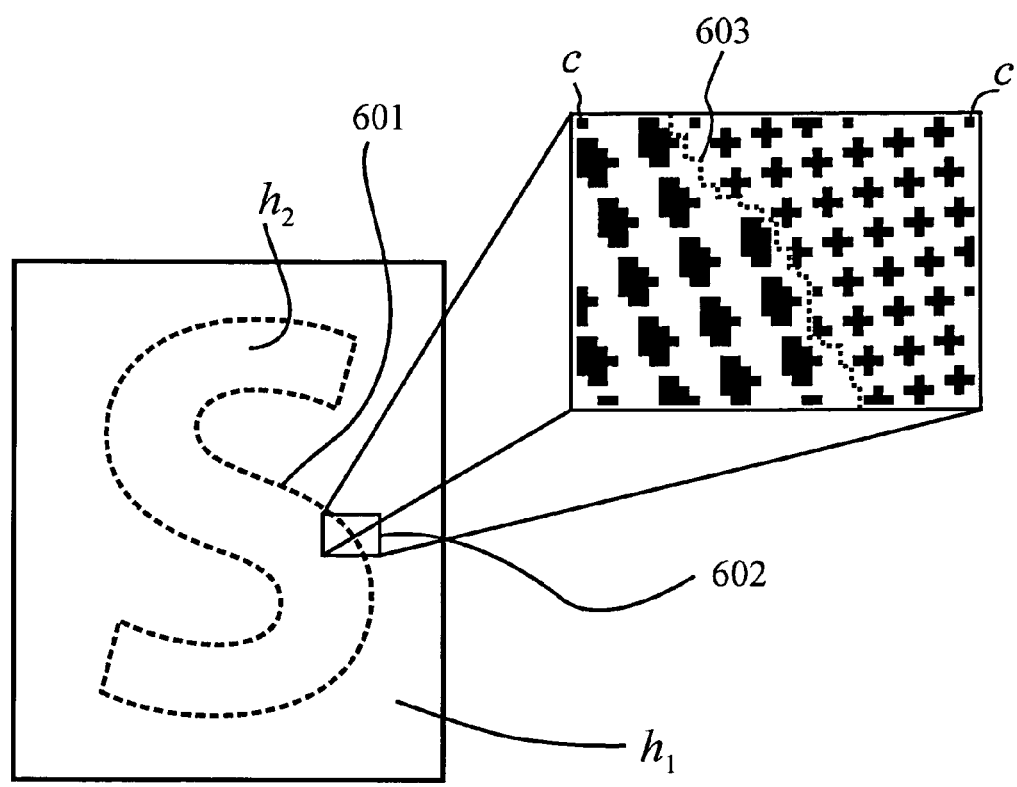
FIG. 6 shows the optimal boundary 603 following the contours 601 of a character "S"

The proposed algorithm enables finding optimal boundaries along any arbitrary directions. In analog manner as when calculating the optimal boundary from a top to a bottom location, by symmetry we can choose at each pixel location as main direction the left to right direction, the bottom to top direction or the right to left direction. This enables the generated sub-paths and therefore the calculated optimal boundary to follow the shape of any region, e.g. the shape of a typographic character such as the outlines of the "S" or "d" characters. As a concrete example (FIG. 6), in order to represent an "S" character with cyan pixels c, within the character foreground, i.e. within the region inside the outline 601, pixels are printed according to the halftoning method $h_2$. The background of the character, formed by the region outside outline 601, is printed according to the halftoning method $h_1$. When enlarging one region 602, we observe that the computed optimal boundary follows the contours of that region, i.e. the sub-paths contributing to the optimal boundary 603 not only progress from bottom to top but also progress from right to left.

(g) Multi-Halftone Color Image Generation and Printing

Figure 7:
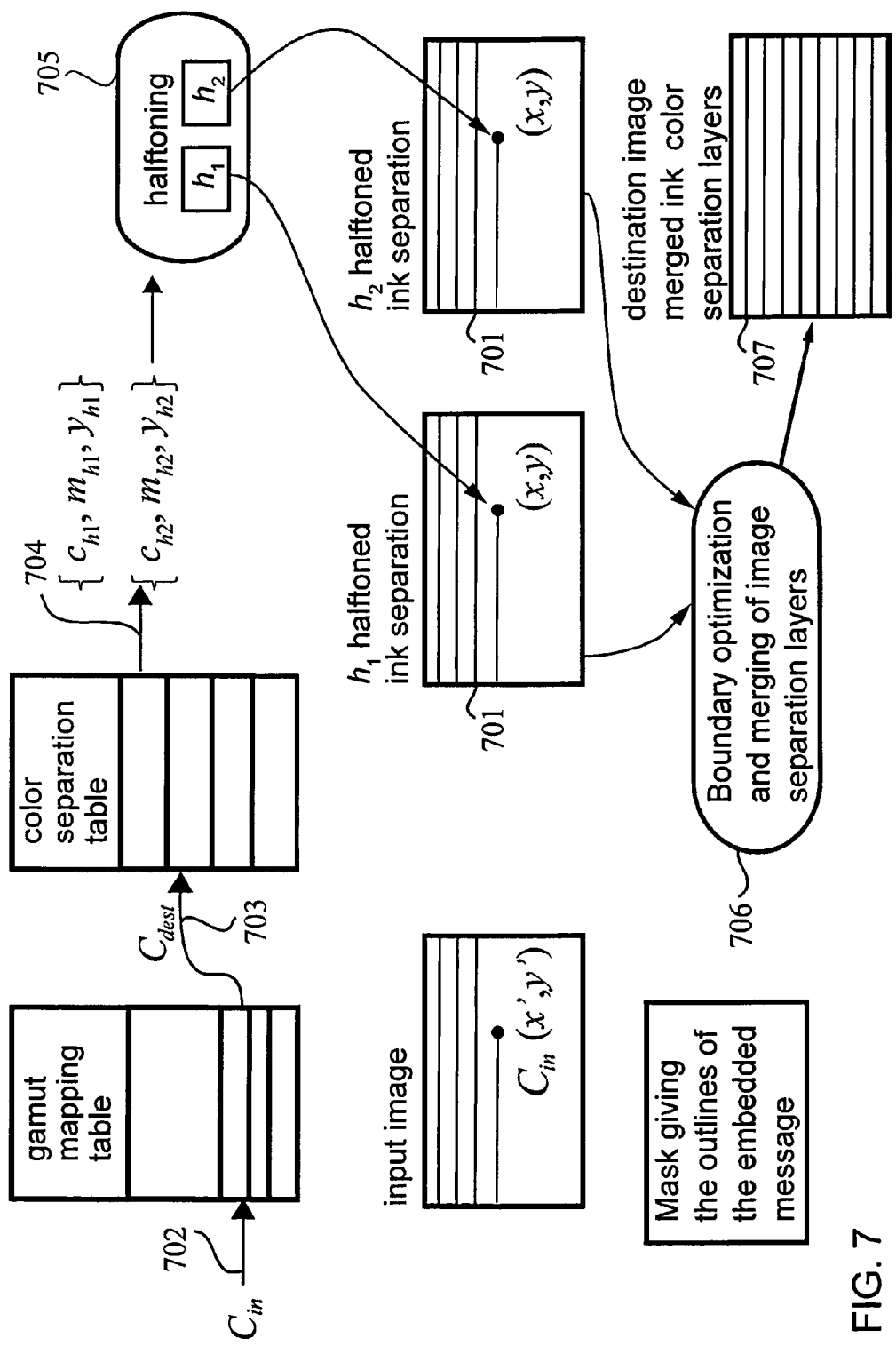
FIG. 7 shows schematically the modules and data structures contributing to the creation of color multi-halftone images.

Multi-halftone color image generation relying on several halftoning methods, e.g. the halftoning methods $h_1$ and $h_2$, is carried out by creating in a computer memory for each halftoning method the multi-valued ink separations corresponding to the input image. The multi-valued ink separations indicate for a considered halftoning method for each ink how much of that ink is to be deposited at each output pixel location, i.e. the surface coverage of that ink that needs to be printed. The multi-valued ink separations for the considered halftoning methods are created by scanning in computer memory the destination image representation formed by the separation layers, scanline by scanline (FIG. 7, 701) and pixel by pixel, at each destination pixel (x,y) finding according to the backward mapping between the destination image space and the input image space, the corresponding location (x', y') within the input image, obtaining the color $C_{in}$(x', y') at that location, performing the gamut mapping by accessing (702) the gamut mapping table and reading the mapped $C_{dest}$(x', y') color, performing for each halftoning method the multi-valued ink separation by accessing (703) the color separation table and reading (704) the surface coverages of the inks associated with the corresponding halftoning method. With the obtained surface coverages, e.g. $\{c_{h1},m_{h1},y_{h1}\}$ or $\{c_{h2},m_{h2},y_{h2}\}$, halftoning is performed by applying the halftoning methods $h_1$ and/or $h_2$ (705). After generating the $h_1$ and $h_2$ halftoned ink separation layers, the optimal boundary (706) is calculated and the halftoned ink separation layers produced by halftoning methods $h_1$ and $h_2$ are merged into the merged halftoned ink color separation layers. The merging operation uses the previously generated optimal boundaries to merge into the message foreground the halftoned ink separation layers generated by halftoning method $h_2$ and into the message background the halftoned ink separation layers generated by halftoning method $h_1$. These merged halftoned ink color separation layers comprise halftones produced according to the different halftoning methods.

The merged halftoned ink color separation layers 707 are sent to the printer for printing (printing technologies: ink-jet, electrophotography, thermal transfer, dye diffusion) or are used to create the plates for offset printing, the cylinders for gravure printing or the cylinders for flexo printing. The resulting print incorporates the destination color image, comprising a message foreground rendered with a halftoning method different from the halftoning method used to render the message background.

Application I: Embedding a Message Hidden by Multiple Color Halftones within a Printed Image on a Substrate Containing Optical Brighteners (e.g. Fluorescent Paper or Fluorescent Semi-Transparent Substrate)

Figure 8:
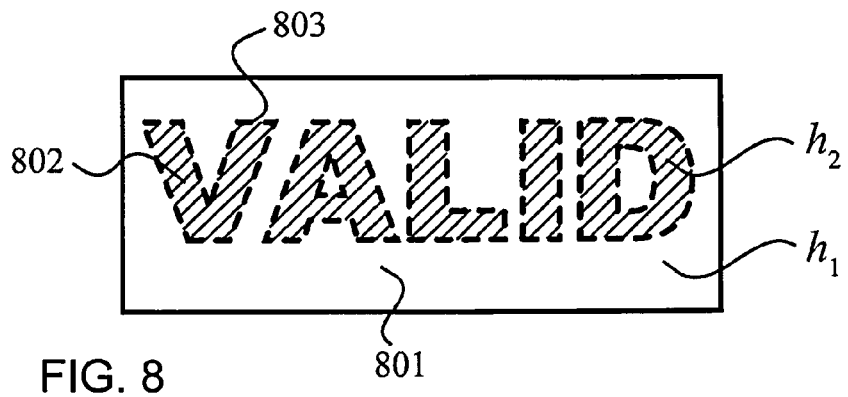
FIG. 8 shows an example of a color image incorporating a hidden message whose background is printed with halftoning method $h_1$ and whose foreground is printed with halftoning method $h_2$ different from $h_1$.
Figure 9A:
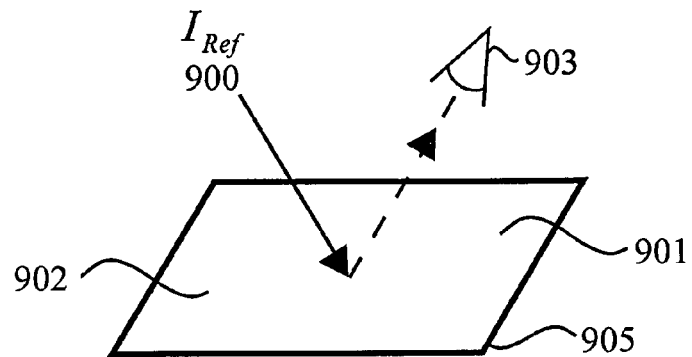
FIG. 9A shows that the message of FIG. 8 printed on a optically brightened paper is hidden when viewed by a human being under a reference illuminant and FIG. 9B shows that the message is revealed when viewed under an illuminant that differs from the reference illuminant.
Figure 9B:
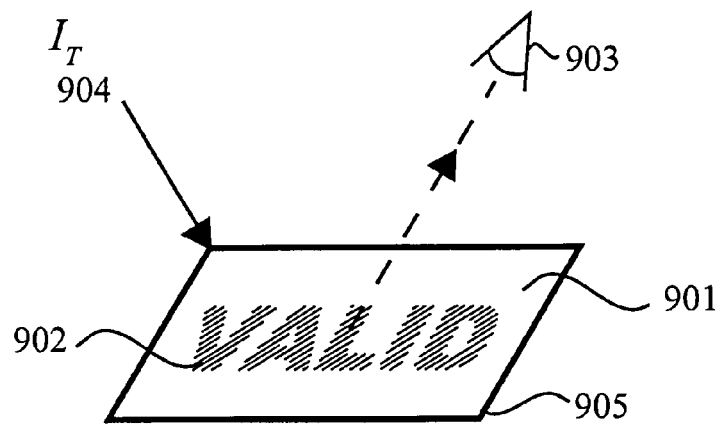

After mapping of image input colors to colors located at the ink destination gamut $G_{dest}$, it is possible to incorporate onto a variable color or grayscale image (FIG. 8, 801) a hidden message 802, e.g. the letters "VALID". The halftone colors inside the regions 803 formed by the letters are reproduced with the halftoning method $h_2$ while the colors outside the letter regions are reproduced with the halftoning method $h_1$. Since the regions delimiting $h_1$ and $h_2$ are computed by finding an optimal boundary between the two halftoning methods and since respectively the color or spectral prediction model enables creating for a reference illuminant within the ink separation table for each entry accurate values of the amounts of inks (surface coverages), under that selected reference illuminant (e.g. D65 simulating a daylight illuminant), it is not possible to distinguish the color printed with halftone $h_1$ and the one printed with halftone $h_2$ on that fluorescent substrate. Therefore, the message regions (dashed line 803) remain hidden under the selected reference illuminant; only the variable intensity color image is visible (FIG. 9A, 901). Under a different illuminant 904 (FIG. 9B), e.g. an A illuminant embodied by a tungsten lamp (FIG. 9B, $I_A$), the optical brighteners of the paper are less excited. The reduction in paper fluorescence in the blue wavelength part of the spectrum yields a color change. When the illuminant is not the reference illuminant, the ink separations for the $h_1$ halftoning method do not produce the same color as the ink separations associated with $h_2$ halftoning method, thereby revealing the hidden message (902), which stands out of the surrounding variable intensity color image (901).

Figure 10:
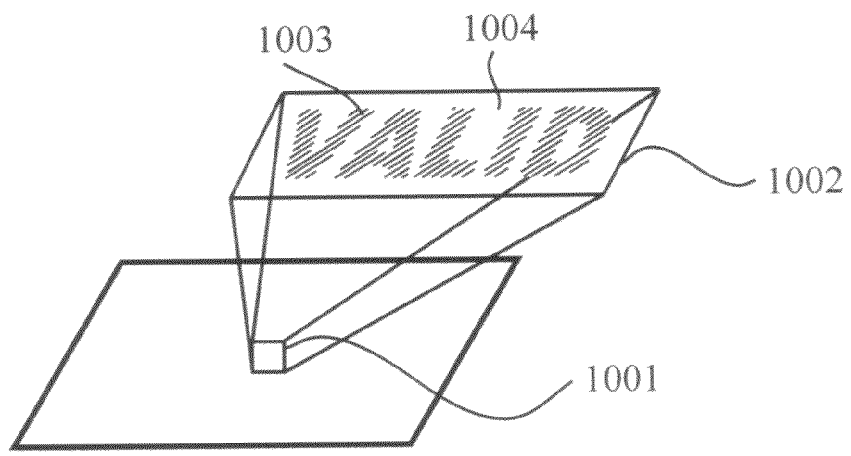
FIG. 10 shows that the hidden message of FIG. 8 appears when enlarged with a magnification device.
Figure 11:
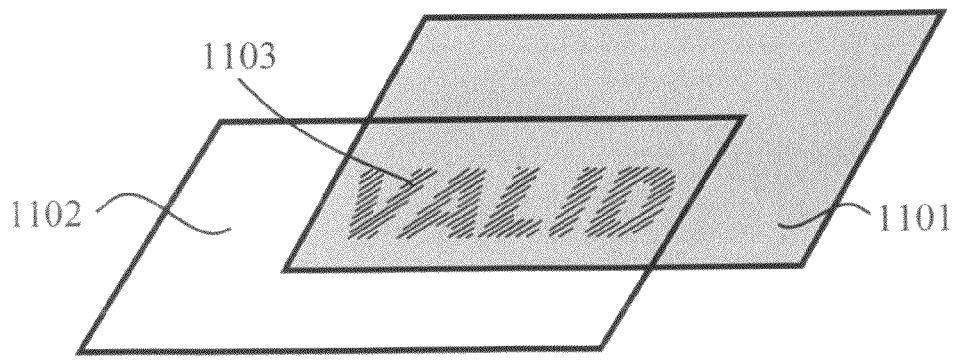
FIG. 11 shows that the hidden message of FIG. 8 is revealed when superposing a revealing layer 1101 on top of the color multi-halftone image.

Application II: Embedding a Message Hidden by Multiple Color Halftones within a Printed Image A multi-halftone color image can be authenticated by observing the color multi-halftone with an enlarging device such as a magnifier. The magnifier is placed at the location where the message is hidden (FIG. 10, 1001). Within the enlarged image of that location (1002), a human observer or a computer vision system can clearly distinguish the foreground (1003) and background (1004) differently halftoned regions and therefore recognize the embedded message. The authenticity verification can also be performed by superposing a revealing layer (FIG. 11, 1101) on the top of the color multi-halftone image (1102). The revealing layer is for example a line screen printed on a transparency sheet or lenticular lenses at an angle and a frequency equal to one of the ink angles and screen frequencies of either the $h_1$ or $h_2$ halftoning parameters. On the superposition of the revealing layer and the color multi-halftone image, the frequency of the revealing layer interferes with one of the frequencies of the halftoned regions of the color multi-halftone image. This reveals the hidden message "VALID" (1103). Another possibility of authenticity verification is obtained by photocopying the color multi-halftone image. When photocopying the color multi-halftone image the sampling action of the photocopier interferes with the halftone dots of the two halftones produced with halftoning methods $h_1$ and $h_2$. In addition, the photocopier rehalftones the scanned image with its own halftoning method and own halftoning parameters, yielding a different dot gain in each of the two halftoned regions of the photocopied image. This has the effect of revealing the hidden security message.

Application III: Embedding within a Printed Image Multiple Messages Hidden by Using Multiple Halftoning Methods.

Figure 12A:
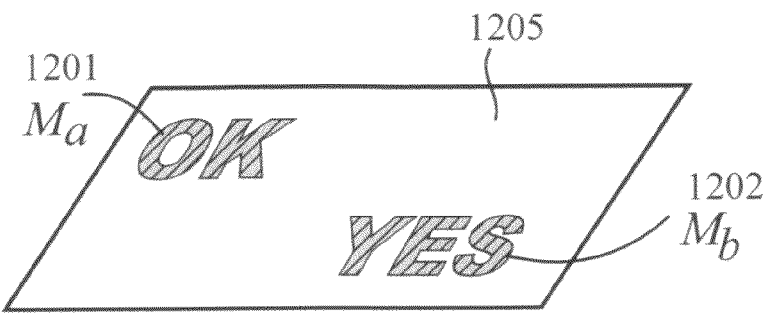
FIGS. 12A, 12B and 12C show two messages $M_a$ and $M_b$ incorporated within an image whose foregrounds are rendered with respectively halftoning methods $h_2$ and $h_3$ and whose background is rendered with halftoning method $h_1$.
Figure 12B:
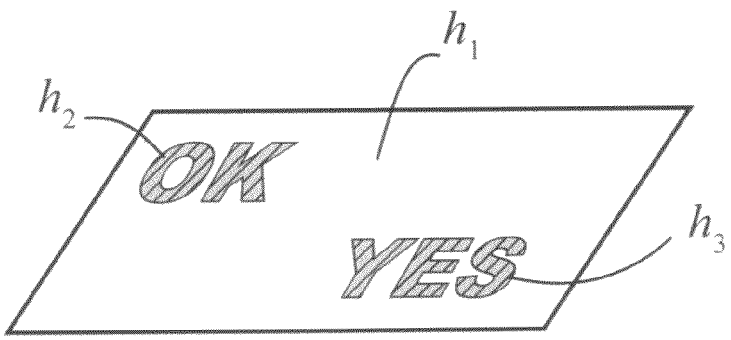
Figure 12C:
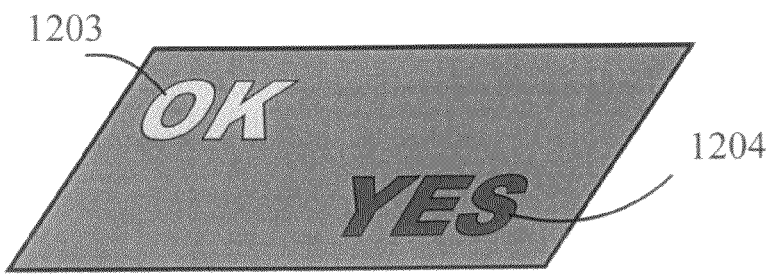

In order to hide two different messages $M_a$ (FIG. 12A, 1201) and $M_b$ (FIG. 12A, 1202) into a color image 1205, one may use three different halftoning methods $h_1$, $h_2$, $h_3$, for example having respective screen frequencies $l_1$, $l_2$, $l_3$, with $l_2 < l_1 < l_3$. The message foreground regions $M_a$ and $M_b$ are halftoned with respective methods $h_2$ and $h_3$ and the background of the image with halftoning method $h_1$ (FIG. 12B). Since exact ink layer surface coverages are deduced from the color prediction models, the different message foreground and background regions have accurate colors. With the creation of optimal boundaries between message foreground and background, the message is perfectly hidden on the original multi-halftone color print. When photocopying the color multi-halftone image, the photocopier scans the background and the two foreground region structures $M_a$ and $M_b$ and reproduces them with its own color reproduction methods. Therefore, the three differently halftoned color multi-halftone regions appear in three different colors in the photocopied image, e.g. the message OK (FIG. 12C, 1203) appears brighter than the background and the message YES (FIG. 12C, 1204) appears darker than the background. A document on which the multi-halftone message is hidden, and which is revealed by photocopy is therefore an authentic document.

Figure 13:
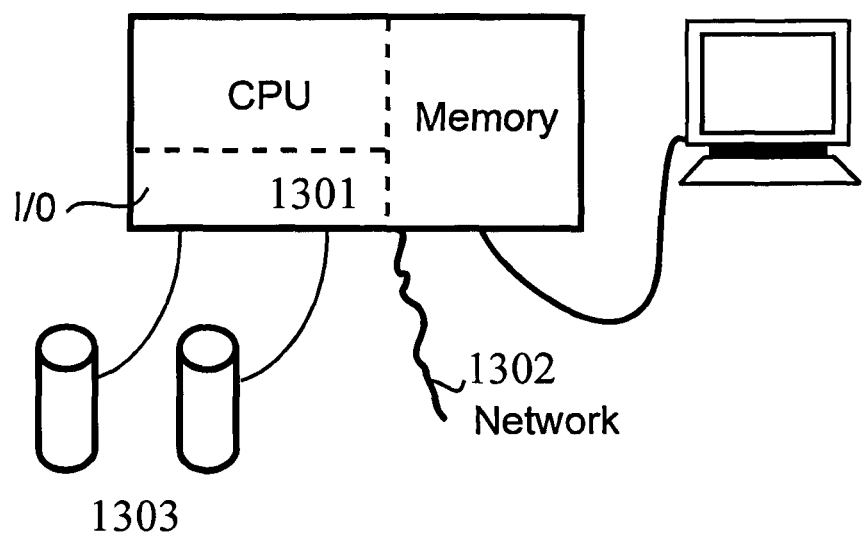
FIG. 13 shows a computing system for creating color multi-halftone images comprising a CPU, memory, I/O interfaces, disks, a display, a keyboard and a network connection.
Figure 14:
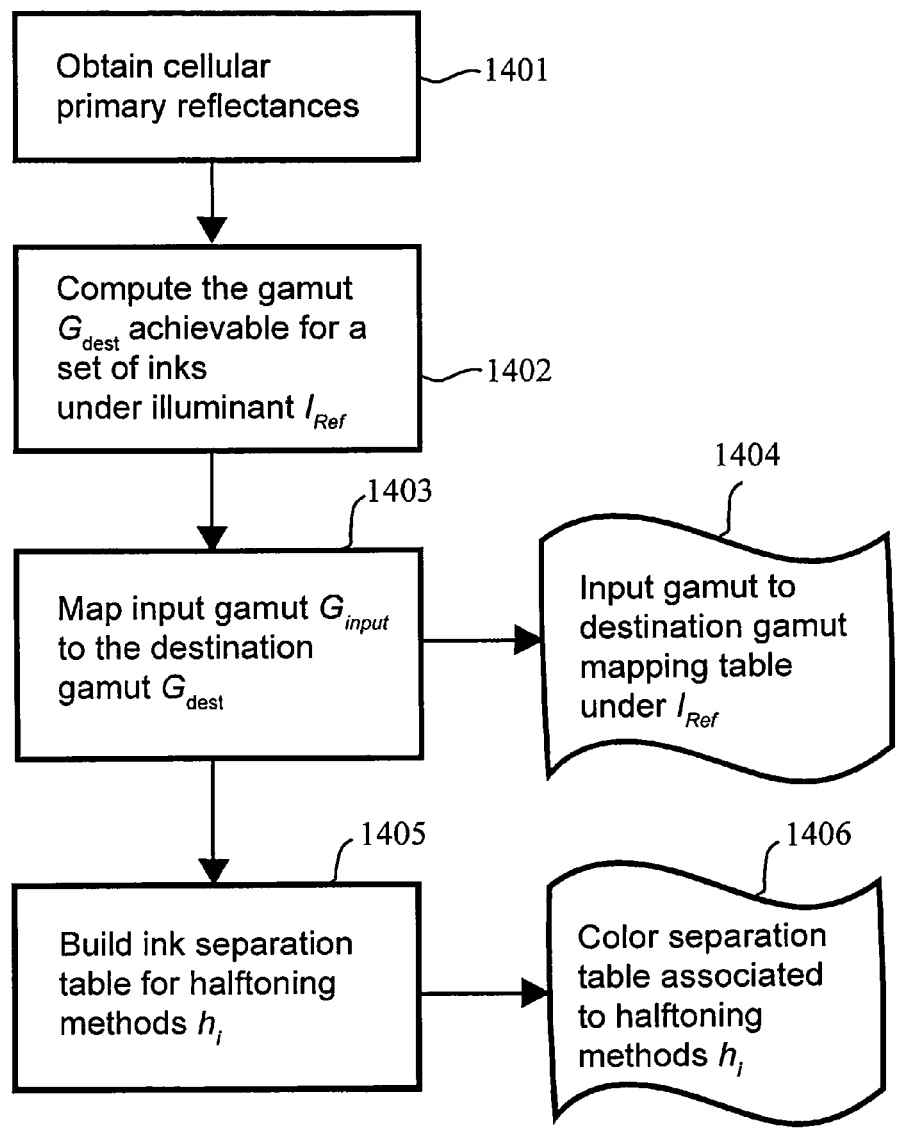
FIG. 14 describes the initialization steps performed by the computing system when creating color multi-halftone images.
Figure 15:
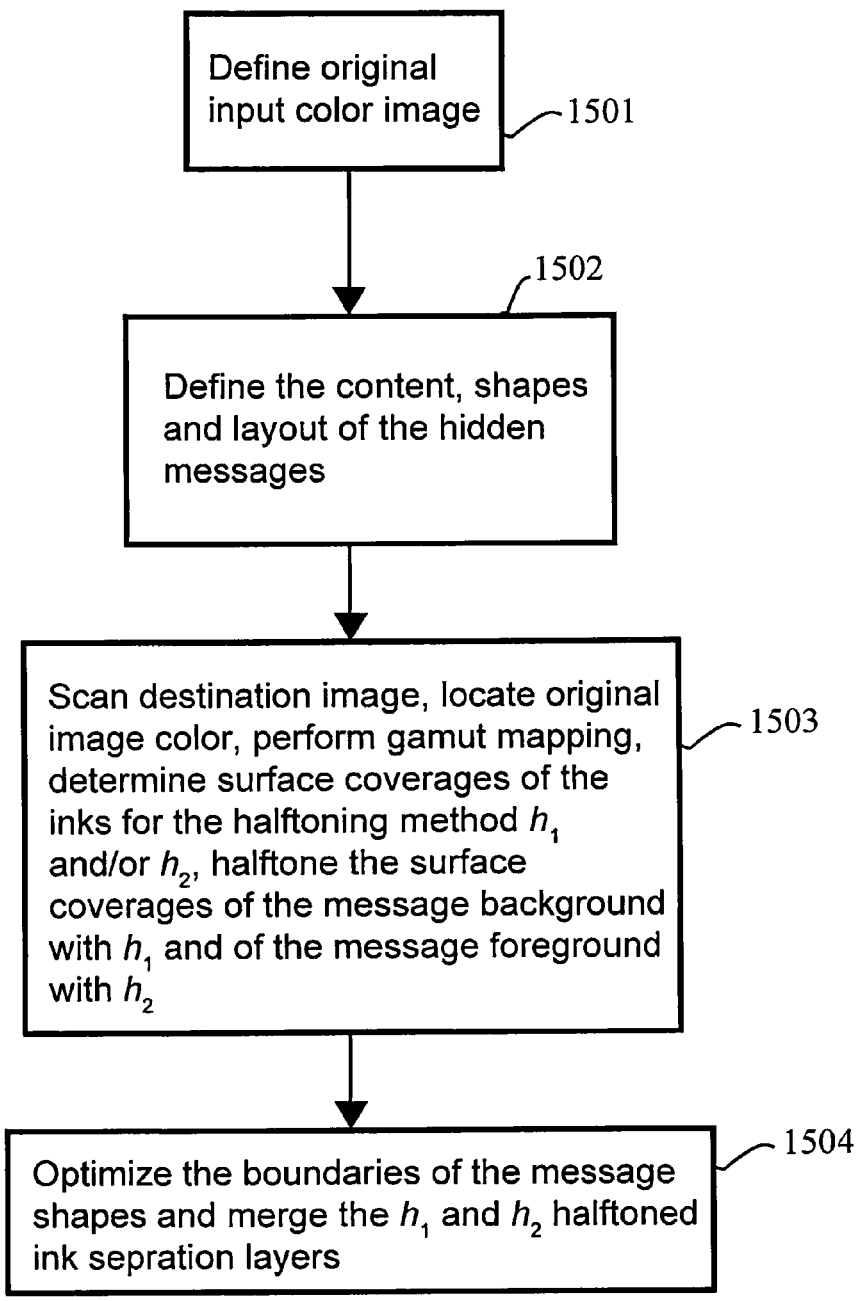
FIG. 15 shows the steps performed in order to create color multi-halftone images incorporating hidden messages.

Computing System Based Implementation of the Methods for Creating Color Multi-Halftone Images A software package running on a computer system (FIG. 13: CPU, Memory, input/output 1301, communication means 1302, storage means such as disks 1303) allows creating in memory or on disks color multi-halftone images. Let us describe the initialization steps (FIG. 14) performed by the software when launching the system. The color multi-halftone image rendering system is initialized by performing the steps of obtaining in reflectance mode the reflectances 1401, respectively in transmission mode the transmittances, of the cellular Neugebauer primaries, i.e. the paper white, the solid inks, the solid ink superpositions as well as each ink halftone at 50% nominal surface coverage superposed with all other inks at 0%, 50% and 100% nominal surface coverages, halftoned by halftoning methods $\{h_i: h_1, h_2, \ldots \}$ under the chosen reference illuminant. This can be carried out by manual or by robotic spectrum acquisition. With the help of a color or spectral prediction model, for each of the considered halftoning methods $h_i$, a relationship is established for the selected illuminant $I_{Ref}$ between the surface coverages of the inks and predicted color. By predicting with one of the halftoning method, e.g. $h_1$, a large number of colors thanks to many combinations of surface coverages (e.g. each ink at nominal surface coverages of 0, 0.05, 0.1, ..., 0.9, 0.95, 1), a data set comprising many colors is formed and its gamut 1402 is obtained, thereby obtaining the destination gamut $G_{dest}$, see [Cholewo and Love 1999]. In a further step, a selected input gamut, e.g. the display gamut or the input image gamut is mapped by the software 1403 into the printable destination gamut $G_{dest}$. This operation results in a gamut mapping table 1404 mapping the input colors into the destination gamut $G_{dest}$ colors under reference illuminant $I_{Ref}$. A last initialization step consists in building thanks to the spectral or color prediction model, the ink separation table 1405 indicating, for each color of the selected color space (e.g. CIELAB) the amounts of inks, i.e. in terms of nominal surface coverages, the surface coverages of the inks, for the selected halftoning method $h_i$, allowing to print that color under the reference illuminant $I_{Ref}$. Once the system is initialized, color multi-halftone images can be created by the software in memory and sent to the printer (FIG. 15).

This may be carried out by the following steps. An automatic or an operator driven procedure defines the original input color image 1501 as well as the content, layout and regions of the hidden message 1502. For the halftoning method $h_1$ used to halftone the background color image and for the halftoning method $h_2$ used to halftone the message foreground, a color image is generated by determining at each destination location the corresponding original input color, by mapping this input color into the printable destination gamut $G_{dest}$, through access of the gamut mapping table, and by determining the surface coverages of the inks to be printed at the current destination image location for the considered halftoning method (1503). An optimal boundary between the differently halftoned regions is found. The halftoned ink separation layers of the different halftoning regions rendered with the corresponding halftoning methods $h_1$ and $h_2$ are merged 1504 along the optimal boundary. The merged ink color separation layers are either sent to the printer, used to create the offset plates for offset printing or to create the cylinders for gravure or for flexo printing.

Figure 16:
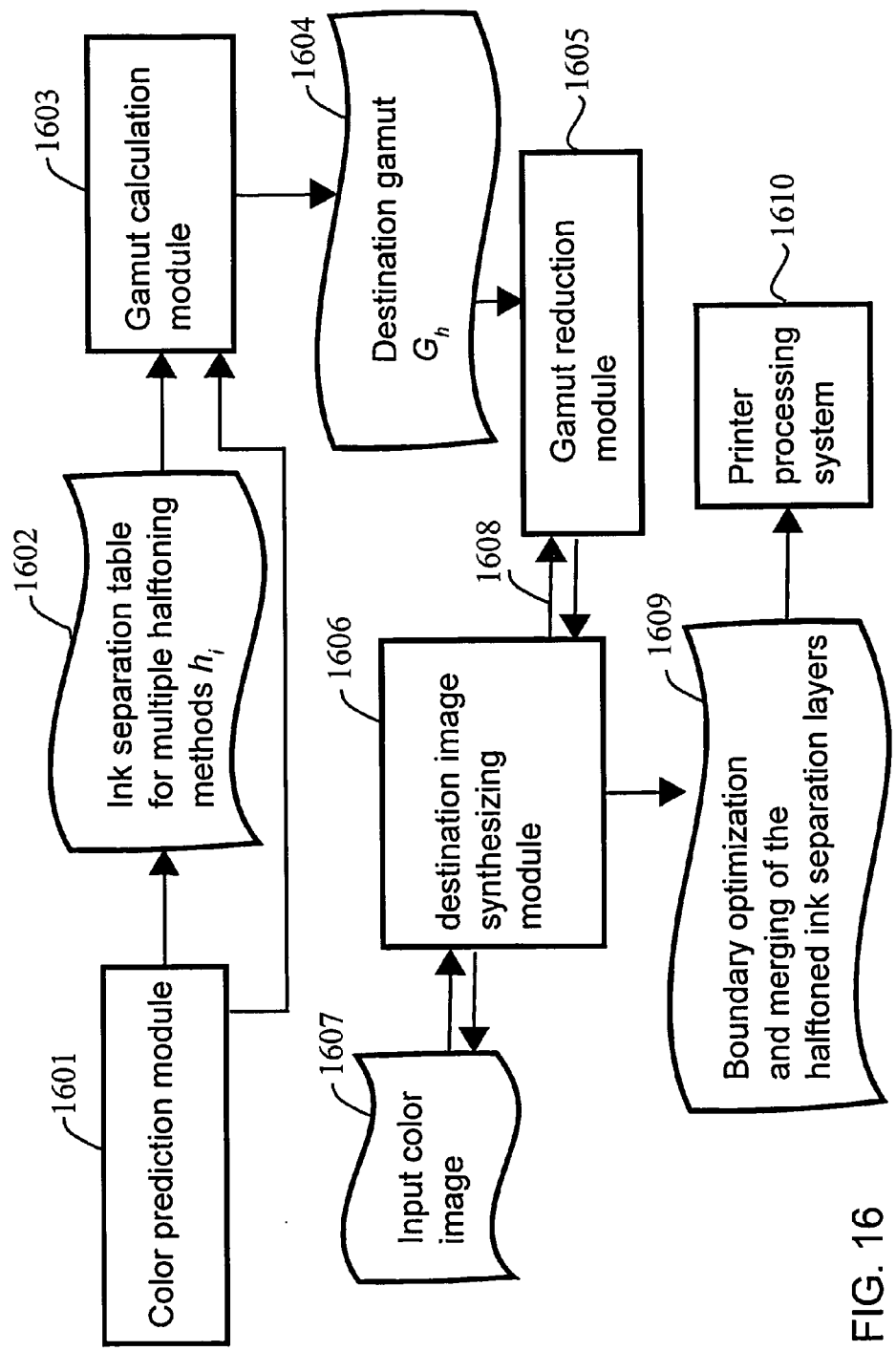
FIG. 16 shows interacting software modules of a computing system operable for synthesizing authenticable color multi-halftone images.

Computing System for Synthesizing Color Multi-Halftone Images Incorporating Hidden Messages A computing system for synthesizing multiple color halftone images comprises a number of software modules, simply called "modules". At system initialization time, a color (or spectral) prediction model module (FIG. 16, 1601) establishes the relationship between colors and the ink surface coverages for each of the considered halftoning methods $h_i$ by creating ink separation tables 1602. A gamut calculation module 1603 computes the destination gamut $G_{dest}$ 1604 under the reference illuminant $I_{Ref}$ by relying on the colors produced by the color prediction module for the halftoning method $h_1$. A gamut reduction module 1605 performs the mapping of the input gamut onto the destination gamut. At synthesizing time, a destination image synthesizing module 1606 scans the locations of the destination image, locates the corresponding locations within the original input color image 1607, gets these input colors, calls 1608 the gamut reduction module in order to map the input colors into the destination gamut colors, performs the halftonings, for the background and the foreground of the hidden message, merges the halftoned ink separation layers by finding the optimal boundaries between the message foreground and background regions 1609 and sends the merged halftoned ink color separation layers for further processing to a printer processing system 1610, i.e. either directly to the printer (inkjet, thermal transfer, dye diffusion), or the imaging device responsible for producing the supports required for printing (offset plates for offset, cylinders for gravure printing or for flexo).

Authenticating by a Human being or by an Apparatus

Figure 9C:
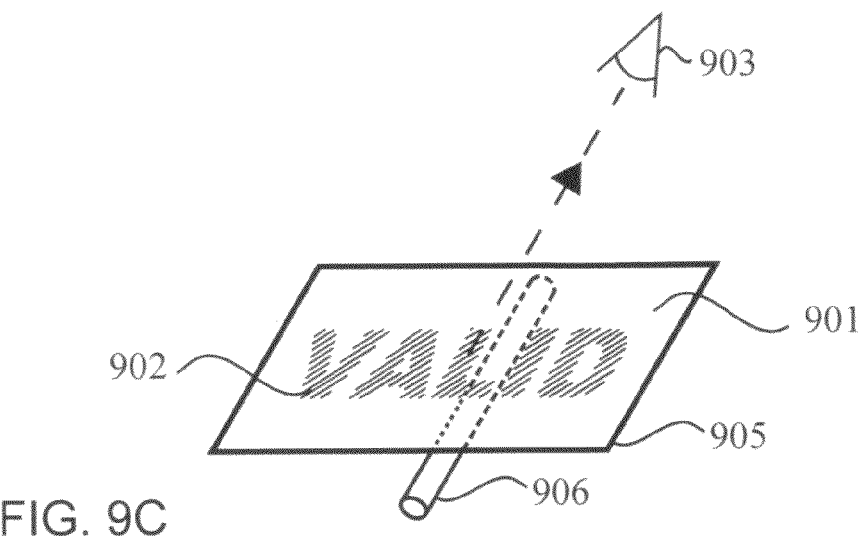
FIG. 9C shows the message of FIG. 9A which is hidden in reflection mode and revealed in transmission mode when illuminated from the back by a light source 906.

Authenticating a security document or a valuable item can be carried out by a human being, for example the person verifying the identity of the passengers embarking on an airplane, the border guard that examines the authenticity of valuable items in transit or the customer buying a valuable item such as a watch. The person verifying the valuable item incorporating the color multi-halftone image embedding the hidden message first views it (FIG. 9A, 903 represents a human eye) under the reference illuminant $I_{Ref}$(FIG. 9A, 900) and verifies that the message is indeed hidden (902) under that reference illuminant. Then, the person verifying the authenticity superposes a revealing layer on the top of the color multi-halftone image (FIG. 11, 1101) and verifies that the message 1103 is revealed. In case that the considered multi-halftone image is printed on substrate that can be viewed both in reflection mode and in transmission mode, one may verify that the message is hidden when viewed in reflection mode and that it is revealed when viewed in transmission mode (FIG. 9C) or alternately that the message is hidden when viewed in transmission mode and that it is revealed when viewed in reflection mode.

The authentication of the valuable item may also be carried out by an apparatus, which projects a reference light source or reference illuminant $I_{Ref}$ on the valuable item incorporating the color multi-halftone image embedding the hidden message, acquires it with an acquisition device (e.g. a camera or a multi-channel sensor array) and processes the color multi-halftone image and extracts the differently halftoned regions of the image. This apparatus compares the extracted message with a reference message according to methods known in the art and decides if the message matches a previously registered message or not. If a match is found, the valuable item incorporating the color multi-halftone image is labeled as authentic.

Figure 17:
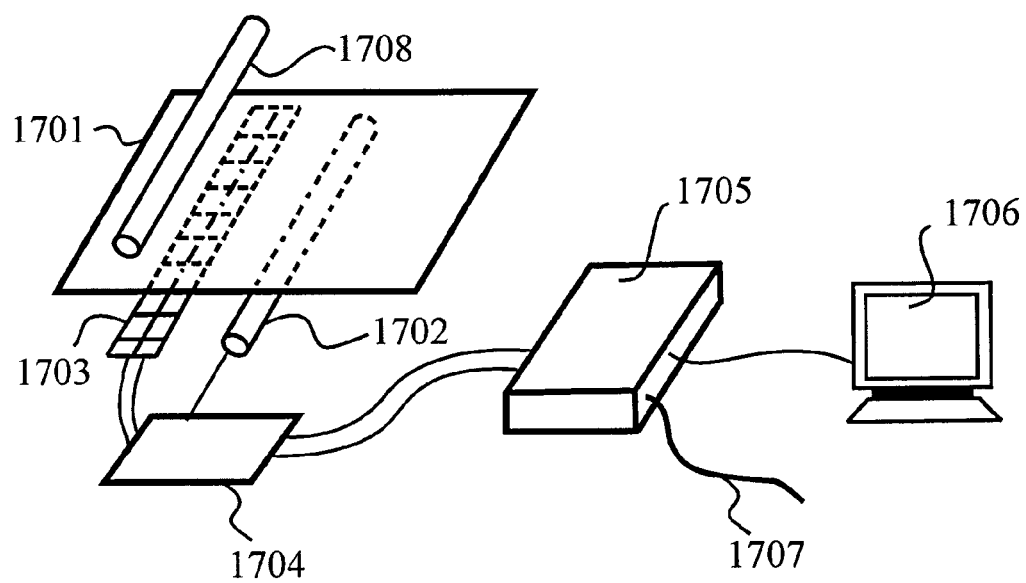
FIG. 17 shows an example of a computer-based authentication apparatus working in reflectance mode and in transmission mode.

An example of such a computer-based authenticating apparatus is given in FIG. 17. It comprises a light source 1702 with the reference illuminant, the color multi-halftone image 1701 embedding the hidden message, the multi-channel sensor array 1703 and its electronics 1704, and a computing system 1705 storing in its memory the images acquired by the multi-channel sensor array. The computing system may also incorporate a display 1706 indicating if the valuable item being scanned is authentic or not. As an option, the computing system may be connected to the Internet 1707 in order to validate that the images acquired from the scanned valuable item are valid. Let us give an example of how such an apparatus works. The apparatus scans the valuable item 1701 by displacing the valuable item in respect to the light source 1702 and the multi-channel sensor array 1703. The computing system 1705 verifies that the colors of the scan are substantially similar to the colors of a previously recorded scan located in its memory or in the memory of a computer connected to the Internet 1707. It further extracts the differently halftoned regions of the scan and thanks to a texture matching algorithm compares the extracted halftones composing the message foreground and background regions with previously recorded background and foreground message region halftones. If a match is found, the display 1706 shows that the valuable item is authentic. A further variant of finding a match can be performed by sampling the valuable item at a resolution substantially similar to one of the halftoning method frequencies used to halftone the message foreground and background regions. The sampling action of the scanner interferes with one of the frequencies of the scan and the computing system recognizes the message thanks to pattern matching. If the message is recognized, the display shows that the valuable system is authentic. In case that the considered multi-halftone image is printed on a substrate that can be viewed both in reflection mode and in transmission mode, the computing system may also have a light source 1708 on the other side of the color multi-halftone image and may verify that in transmission mode that the colors of the scan are substantially similar to the colors of a previously recorded scan. The computer system then extracts in reflection mode the differently halftoned regions of the scan and thanks to a texture matching algorithm compares the extracted halftones composing the message foreground and background regions with previously recorded background and foreground message region halftones. Alternately the same procedure can be applied by exchanging the reflection mode and the transmission mode, i.e. by verifying that in transmission mode the colors of the scan are substantially similar to the colors of a previously recorded scan and by extracting in transmission mode the differently halftoned regions of the scan and verifying that they match previously recorded background and foreground message region halftones.

Another authentication method relies on an enlarging device such as an enlarging glass or a microscope, possibly connected to an image acquisition device. The color multi-halftone image is formed by the message foreground and background rendered with different halftoning methods. Regions of the message foreground and background embedded within the color multi-halftone image can be produced and registered as signature of the original on a Web server. These regions can be compared with regions of the printed color multi-halftone image obtained by enlargement. If the registered and the actual halftone regions are substantially similar, the color multi-halftone image is considered as authentic.

Another possible second level authentication requires a photocopier. In a first step, a human being verifies that under the reference illuminant the message is hidden. In a second step, the color multi-halftone image is photocopied and a human being verifies that the message appears in the resulting photocopied color multi-halftone image.

Advantages

The proposed techniques for creating authenticable color multi-halftone images require generating multi-valued ink separations for each of the two halftoning methods $h_1$ and $h_2$. Since the halftoning methods $h_1$ and $h_2$ are different, e.g. have a different screen frequency, the dot gain within the different halftoned ink separation layers is different. By relying on an accurate color prediction model enhanced to account for ink spreading (physical dot gain) of the ink halftone dots, we accurately compute the ink surface coverages of the ink separation layers producing a given colorimetric value. Therefore, the input image colors printed either with halftoning method $h_1$ or with halftoning method $h_2$ are reproduced as substantially identical colors. When incorporating a message into the color multi-halftone image by halftoning the message background regions with halftoning method $h_1$ and the message foreground regions with halftoning method $h_2$, the reproduced input image colors are reproduced on the differently halftoned regions of the color multi-halftone image. The reproduced colors are also preserved at the boundary between the message foreground and background regions by computing an optimal boundary between these regions. Both the usage of an accurate spectral prediction model accounting for ink spreading and the computation of an optimal boundary between the differently halftoned message foreground and background regions ensure that the message incorporated within a color multi-halftone image is hidden for a human being observer. A color multi-halftone image may be created on semi-transparent or fully transparent substrate to hide a message when viewed in reflection mode and display it in transmission mode or alternately, to hide the message when viewed in transmission mode and view it in reflection mode. Since dot gain is not the same in reflection and transmission modes, one may hide the message either in transmission mode or in reflection mode, by relying on the color prediction model to compute accurate ink surface coverages. This ensures that halftones reproduced with halftoning methods $h_1$ or with halftoning method $h_2$ are reproduced as substantially identical colors either in transmission or in reflection mode, according to the mode in which the color prediction model has been calibrated. There are several ways for authenticating a color multi-halftone image incorporating a hidden message by revealing the hidden message. The hidden message can be revealed by photocopying the color multi-halftone image, by placing a revealing layer on the color multi-halftone image, by observing the color multi-halftone image with a magnifier, by scanning the color multi-halftone image or by illuminating the color multi-halftone image with an illuminant different from the reference illuminant used within the spectral prediction model. In addition, in case of an authenticable color multi-halftone image imaged on a semi- or fully transparent substrate, authentication can be performed by verifying that the message is hidden when viewed either in reflection or in transmission mode and that it is revealed when viewed in the other mode.

The invention claimed is:

1. A computer-based method for producing a printed authenticable color multi-ink multi-halftone image, comprising the steps of
   (a) selecting two halftoning methods $h_1$ and $h_2$ having different halftoning parameters;
   (b) selecting a color input image and an input color gamut;
   (c) positioning a message and determining its foreground and background regions within said input image;
   (d) gamut mapping by computation said input color gamut onto a printable destination gamut yielding gamut mapped input colors;
   (e) under a selected reference illuminant, establishing with an accurate ink spreading enhanced color prediction model colorimetric to ink surface coverages mappings $m_1$ and $m_2$ between desired input colorimetric values and ink surface coverages for each of said respective halftoning methods $h_1$ and $h_2$ ensuring that the gamut mapped input colors yield substantially similar colorimetric values when halftoned with said halftoning method $h_1$ and halftoned with said halftoning method $h_2$;
   (f) by relying on said colorimetric to ink surface coverage mappings $m_1$ and $m_2$, separating by computation the gamut mapped input color image into multi-valued ink separations $s_1$ to be halftoned by said halftoning method $h_1$ and into multi-valued ink separations $s_2$ to be halftoned by said halftoning method $h_2$;
   (g) halftoning said multi-valued ink separations $s_1$ with said halftoning method $h_1$ and $s_2$ with said halftoning method $h_2$ yielding respectively halftoned $p_1$ and $p_2$ ink separation layers;
   (h) merging said message foreground and background regions of the halftoned ink separation layers $p_1$ and $p_2$ into merged ink color separation layers q by computing optimal boundaries between said message background regions rendered with said halftoned ink separation layers $p_1$ and said message foreground regions rendered with said halftoned ink separation layers $p_2$;

(i) printing said merged ink color separation layers q, thereby obtaining said color multi-ink multi-halftone image;

where under the selected reference illuminant the message incorporated into the color multi-halftone image is hidden since its foreground and background regions are indistinguishable.

2. The method of claim 1, where said colorimetric to inks surface coverage mappings $m_1$ and $m_2$ are established in reflection mode by calibrating the accurate ink spreading enhanced color prediction model with reflection measurements and as a result where said message incorporated into the color multi-halftone image is hidden when viewed in reflectance mode and revealed when viewed in transmission mode.

3. The method of claim 1, where said colorimetric to inks surface coverage mappings $m_1$ and $m_2$ are established in transmission mode, by calibrating the accurate ink spreading enhanced color prediction model with transmission measurements and where said message incorporated into the color multi-halftone image is hidden when viewed in transmission mode and revealed when viewed in reflectance mode.

4. The method of claim 1, where the message hidden under said reference illuminant is revealed under an illuminant different from the reference illuminant.

5. The method of claim 1, where said message is revealed by observing with an enlarging device the boundaries between said message foreground and said message background regions.

6. The method of claim 1, where said message is revealed by superposing a revealing layer on the top of said color multi-ink multi-halftone image.

7. The method of claim 6, where said revealing layer is embodied by a revealing color halftone printed on a transparency sheet, where at least one ink layer of said revealing halftone is halftoned at a frequency substantially equal to one of the screen frequencies of the group formed by screen frequencies of the $h_1$ and $h_2$ halftoning methods.

8. The method of claim 6, where said revealing layer is a line screen printed on a transparency sheet at an angle and a frequency equal to one of the ink angles and screen frequencies of the group formed by the ink angles and screen frequencies of the $h_1$ and $h_2$ halftoning methods.

9. The method of claim 6, where said revealing layer is a 1D array of lenticular lenses whose angle and frequency is equal to one of the ink angles and screen frequencies of the group formed by the ink angles and screen frequencies of the $h_1$ and $h_2$ halftoning methods.

10. The method of claim 1, where a second message is hidden by embedding into said color multi-ink multi-halftone image an additional message whose foreground regions are printed with a halftoning method $h_3$ different from said halftoning methods $h_1$ and $h_2$ and whose halftoned ink separation layers $p_3$ are merged by computing optimal boundaries between the second message foreground regions and said message background regions.

11. The method of claim 1, where said message is revealed by photocopying said color multi-ink multi-halftone image.

12. A valuable item comprising a color multi-ink multi-halftone image produced according to the method of claim 1, said valuable item being selected from the set of bank notes, checks, trust papers, identification cards, passports, travel documents, tickets, diploma, business documents, bank documents, tracing documents, medical drug packages, commercial art, fashion articles, watches, clocks, bottles of perfumes, body care liquids, alcoholic drinks, clothes, and attached labels.

13. A computed based apparatus operable for authenticating the valuable item of claim 12, comprising a reference illuminant, a multi-channel sensor array and a computing system, where the reference illuminant illuminates the color multi-halftone image incorporated into said valuable item and the multi-channel sensor array acquires a sampled image of said illuminated color multi-halftone image, where the computing system authenticates the valuable item by (a) verifying that the colors of the sampled image are substantially similar to the colors of a previously registered color multi-halftone image, by (b) extracting the differently halftoned regions of the acquired sampled image and by (c) comparing the differently halftoned regions composing the extracted message with previously registered halftoned regions composing a reference message.

14. The computed based apparatus of claim 13, where said valuable item is further authenticated by comparing the produced message formed by the differently halftoned regions with a previously registered message.

15. A computing system comprising a processing unit, a memory, input-output devices, communication means and storage means operable for synthesizing a printable authenticable color multi-ink multi-halftone image embedding a hidden message, said computing system comprising an ink spreading enhanced color prediction module establishing for a selected halftoning method, a mapping between colorimetric values and ink surface coverages, a gamut calculation module computing gamut boundaries of a selected set of inks, a gamut mapping module mapping an input gamut into a destination gamut, a multi-halftone synthesizing module, a boundary optimization module, where said boundary optimization module merges message foreground and background regions of the halftoned ink separations layers $p_1$ and $p_2$ into merged ink color separation layers q by computing optimal boundaries between said message background regions rendered with said halftoned ink separation layers $p_1$ and said message foreground regions rendered with said halftoned ink separation layers $p_2$, where said multi-halftone synthesizing module scans the pixels of the destination image, locates the corresponding locations within an input color image, obtains their original input colors, calls the gamut mapping module to map the original input colors into destination gamut colors, generates for destination gamut colors for each of said halftoning methods $h_1$ and $h_2$ corresponding multi-valued ink separations $s_1$ and $s_2$, produces the halftoned ink separations layers $p_1$ and $p_2$ and calls the boundary optimization module, thereby obtaining the merged ink color separation layers q, where due to the mapping between colorimetric values and ink surface coverages performed by the ink spreading enhanced color prediction module and due to the merging of the halftoned ink separation layers performed by the boundary optimization module, foreground and background regions of said message are indistinguishable by a human observer, thereby hiding the embedded message.

16. The printable authenticable color multi-ink multi-halftone image of claim 15, where the authentication is performed by superposing a revealing layer on the top of it and by verifying the presence of a message, said revealing layer being an element selected from the group of revealing halftone transparency, line screen, array of lenticular lenses, said element being conceived to have an orientation and frequency substantially similar to one of the orientations and one of the frequencies of the halftone ink separation layers.

17. The computing system of claim 15, where said printable authenticable color multi-ink multi-halftone image is printed on an imaging device selected from the group of inkjet printer, electrophotography printer, dye diffusion printer, thermal transfer printer, photolithography, etching, coating, laser marking, laser engraving, laser ablation, offset printing, flexographic printing, gravure printing, serigraphy, and photolithography.

* * * * *